(12) United States Patent
Koga

(10) Patent No.: US 7,145,947 B2
(45) Date of Patent: Dec. 5, 2006

(54) VIDEO DATA PROCESSING APPARATUS AND METHOD, DATA DISTRIBUTING APPARATUS AND METHOD, DATA RECEIVING APPARATUS AND METHOD, STORAGE MEDIUM, AND COMPUTER PROGRAM

(75) Inventor: Tadaharu Koga, Tokyo (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 10/263,918

(22) Filed: Oct. 3, 2002

(65) Prior Publication Data

US 2003/0086003 A1 May 8, 2003

(30) Foreign Application Priority Data

Oct. 4, 2001 (JP) ............................. 2001-308522

(51) Int. Cl.
*H04N 7/12* (2006.01)
*H04N 7/00* (2006.01)

(52) U.S. Cl. .................................... 375/240.01; 348/37

(58) Field of Classification Search ........... 375/240.01, 375/240.02; 348/36, 37; 382/284, 239
See application file for complete search history.

(56) References Cited

U.S. PATENT DOCUMENTS 5,649,032 A * 7/1997 Burt et al. .................. 382/284
6,075,905 A * 6/2000 Herman et al. ............. 382/284
6,650,704 B1 * 11/2003 Carlson et al. ......... 375/240.01
6,694,064 B1 * 2/2004 Benkelman ................. 382/284
6,778,207 B1 * 8/2004 Lee et al. ..................... 348/36

* cited by examiner

*Primary Examiner*—Gims Philippe
(74) *Attorney, Agent, or Firm*—Finnegan, Henderson, Farabow, Garrett & Dunner, L.L.P.

(57) ABSTRACT

In the present invention, omnidirectional video images shot by a plurality of cameras are so distributed that the video images can be changed seamlessly on a receiver side. A panorama image, which is composed of the video frames obtained originally from the plural cameras and arranged on a cylindrical lateral plane, is divided into equal halves, and the second-half frame portion thus divided is placed under the first-half frame portion. Further, rearrangement is performed in such a manner that an extra video frame of the adjacent camera is pasted to one edge of the divided portion, and in the vicinities of both edges of the omnidirectional video image, the video frames of the adjacent cameras thus pasted together are duplicated, whereby any region astride the video frames of the adjacent cameras can be changed seamlessly.

32 Claims, 17 Drawing Sheets

F I G. 1
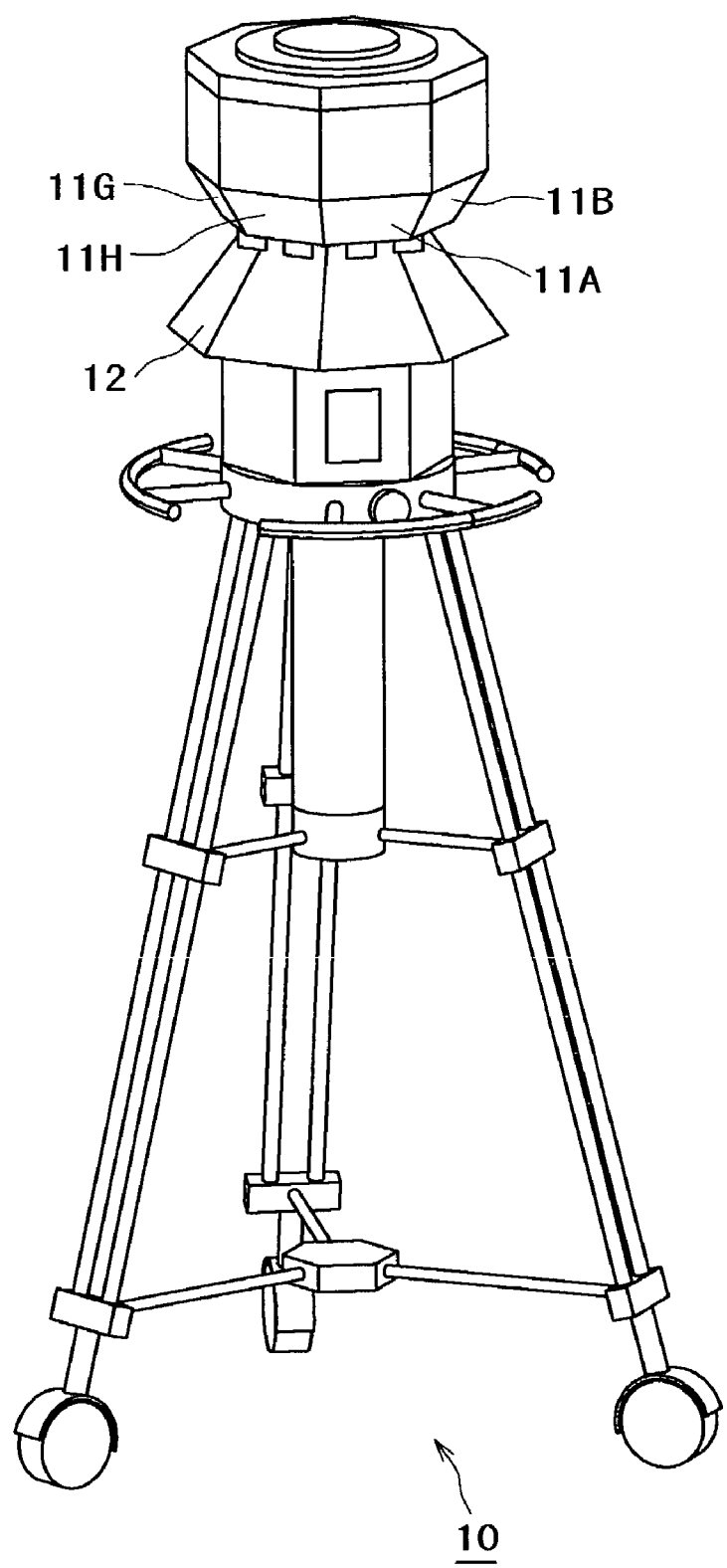

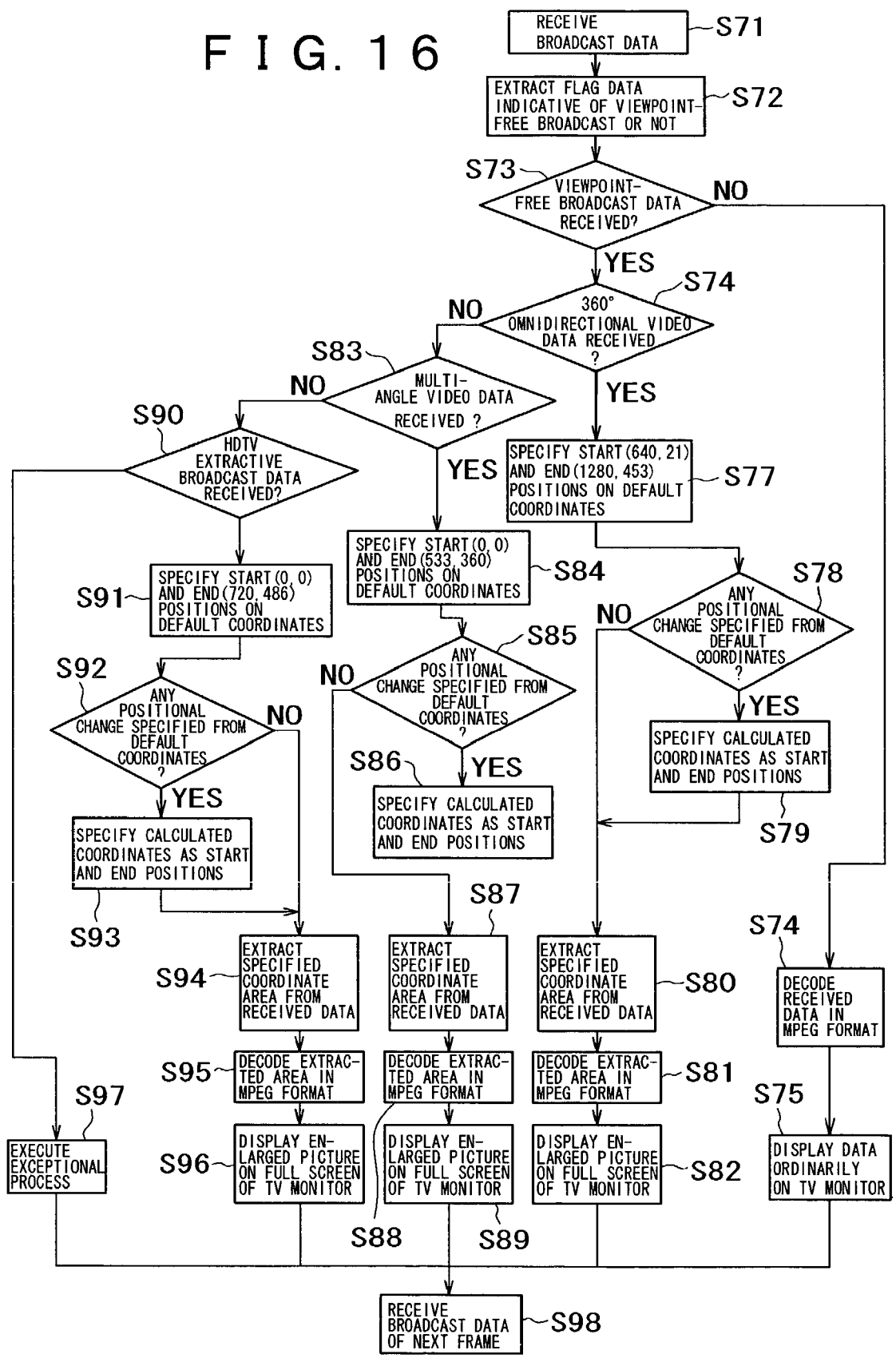

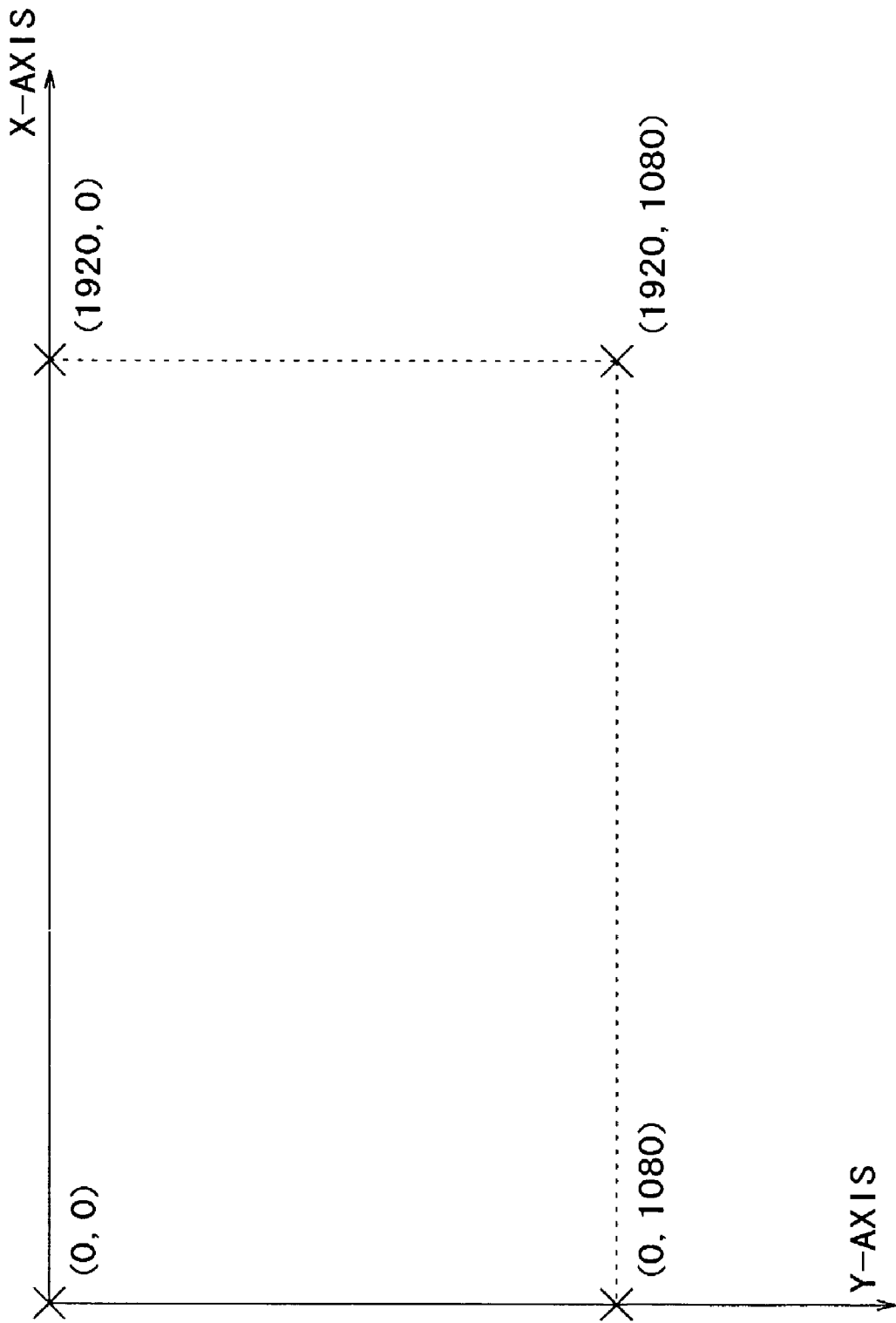

VIDEO DATA PROCESSING APPARATUS AND METHOD, DATA DISTRIBUTING APPARATUS AND METHOD, DATA RECEIVING APPARATUS AND METHOD, STORAGE MEDIUM, AND COMPUTER PROGRAM

BACKGROUND OF THE INVENTION

The present invention relates to a video data processing apparatus, a video data processing method, a data distributing apparatus, a data distributing method, a data receiving apparatus, a data receiving method and a storage medium for distributing video images shot by a camera, and more particularly to those adapted for distributing video images shot by an omnidirectional camera which consists of a plurality of cameras so positioned as to shoot ambient pictures from one viewpoint in the space.

In further detail, the present invention relates to a video data processing apparatus, a video data processing method, a data distributing apparatus, a data distributing method, a data receiving apparatus, a data receiving method and a storage medium for distributing video images, which are obtained from a plurality of cameras, in such a manner that the video images at any desired place can be selected on the receiver side, and more particularly to those adapted for realizing such distribution that the video images obtained from a plurality of cameras can be switched seamlessly on the receiver side.

There is known an omnidirectional camera as an apparatus for providing pictures of ambient scenes around a user. An ambient camera system of this kind consists of a plurality of cameras so positioned as to shoot ambient pictures from one viewpoint in the space. In the ambient camera system or omnidirectional camera system consisting of plural cameras, image processing is executed in a manner that respective boundaries of shot pictures obtained from adjacent cameras are properly connected, whereby pictures of much wider areas than the visual field of each camera are processed to form an image which may originally be obtained by the use of a single wide-angle camera.

Although a wide range can be shot by the use of a lens having a wide visual field, the resolution is deteriorated correspondingly thereto to consequently cause difficulty in recognizing the details. Meanwhile, using an ambient camera system enables provision of sufficient wide-range shot images with the high resolution maintained.

On the other hand, with the recent development of the information communication technology, there exists a demand for distributing video images from cameras to remote sites via a variety of distribution media.

According to the conventional broadcasting technology inclusive of terrestrial broadcasting, satellite broadcasting, cable television broadcasting, high-definition television broadcasting and so forth, fundamentally one video image is receivable per channel. And since the field angle of the video image is previously determined at the time of recording on the transmitter side, it is impossible for the receiving user side to select a video image at a desired place.

Therefore, in order to realize selection of a desired field angle on the receiver side out of the entire omnidirectional video images obtained from a plurality of cameras, it is necessary to simultaneously receive a plurality of channels each composed of video image from one camera. However, realizing the above requires reconstruction of the hardware which causes an increase of the cost on the receiver side as well.

And even if a plurality of video images are rendered watchable simultaneously by reconstruction of the hardware on the receiving side, it is difficult to achieve seamless switching of video images shot by adjacent cameras.

It may be possible to transmit multi-angle images experimentally on a plurality of channels and to broadcast selected images while switching the channels on the receiving side. However, in this case also, it is still difficult to achieve seamless switching of video images from the individual cameras, and an increase of the production cost is unavoidable on the transmitter side as well.

SUMMARY OF THE INVENTION

It is an object of the present invention to provide improvements in a video data processing apparatus, a video data processing method, a data distributing apparatus, a data distributing method, a data receiving apparatus, a data receiving method and a storage medium which are capable of adequately distributing video images shot by an omnidirectional camera consisting of a plurality of cameras so positioned as to shoot ambient pictures from one viewpoint in the space.

Another object of the present invention resides in providing an improvements in a video data processing apparatus, a video data processing method, a data distributing apparatus, a data distributing method, a data receiving apparatus, a data receiving method and a storage medium capable of distributing video images, which are obtained from a plurality of cameras, in such a manner that the video images at any desired place can be selected on the receiver side.

And it is a further object of the invention to provide improvements in a video data processing apparatus, a video data processing method, a data distributing apparatus, a data distributing method, a data receiving apparatus, a data receiving method and a storage medium capable of realizing such distribution that the video images obtained from a plurality of cameras can be switched seamlessly on the receiver side.

According to a first aspect of the invention, there is provided a video data processing apparatus or method for processing video data obtained from a plurality of cameras which are positioned in such a manner that the visual directions thereof are set at a predetermined angular interval on one horizontal plane so as to shoot ambient pictures from one viewpoint in the space. This video data processing apparatus or method includes means or step for generating video images of a first rectangular plane by sequentially pasting the video data from the individual cameras in accordance with the camera positioning order; means or step for generating a second rectangular plane by equally dividing the first rectangular plane into segments and then arranging the segments sequentially from top; means or step for generating a third rectangular plane by duplicating a region of a predetermined area from the left or right edge of each segment at the edge of the other segment to be connected to the relevant one edge; means or step for generating a fourth rectangular plane by reducing the third rectangular plane to a size adapted to be contained in a predetermined encoding format; and means or step for generating a fifth rectangular plane by attaching dummy data to an unused region so that the fourth rectangular plane conforms with the predetermined picture compression format.

Here, the encoding format mentioned above may preferably be based on the HD (High Definition)-MPEG 2 (Moving Picture Experts Group 2) standards employed to carry video data as HDTV broadcast waves.

The video data processing apparatus or method according to the first aspect of the present invention may further include means or step for rendering bit-mapped serial file data where the fifth rectangular planes are arrayed in time series; and means or step for generating transport stream data by converting the data into predetermined output signals and compressing the same in conformity with the encoding format.

According to a second aspect of the present invention, there is provided a data distributing apparatus or method for distributing the video data, which are obtained from a plurality of cameras so positioned that the visual directions thereof are set at a predetermined angular interval on one horizontal plane for shooting ambient pictures from one viewpoint in the space, in such a manner that the viewpoint can be changed freely on the receiver side. This data distributing apparatus or method includes means or step for generating video images of a first rectangular plane by sequentially pasting the video data from the individual cameras in accordance with the camera positioning order; means or step for generating a second rectangular plane by equally dividing the first rectangular plane into segments and then arranging the segments sequentially from top; means or step for generating a third rectangular plane by duplicating a region of a predetermined area from the left or right edge of each segment at the edge of the other segment to be connected to the relevant one edge; means or step for generating a fourth rectangular plane by reducing the third rectangular plane to a size adapted to be contained in a predetermined encoding format; means or step for generating a fifth rectangular plane by attaching dummy data to an unused region so that the fourth rectangular plane conforms with the predetermined picture compression format; means or step for rendering bit-mapped serial file data where the fifth rectangular planes are arrayed in time series; means or step for generating transport stream data by converting the rendered bit-mapped serial file data into predetermined output signals and compressing the same in conformity with the aforesaid encoding format; and means or step for transmitting the transport stream data.

The data distributing apparatus or method according to the second aspect of the present invention may further include means or step for attaching information to signify that the transport stream data are of viewpoint free type.

In the video data processing apparatus and method according to the first aspect of the present invention and in the data distributing apparatus and method according to the second aspect thereof, the omnidirectional video images shot by plural cameras from one viewpoint in the space are processed through pasting, equal division, arrangement and reduction so as to conform with the size of the broadcast encoding format based on the HD-MPEG standard or the like, and dummy data are attached to unused regions. And further on the receiving side, the pasted video frames of the cameras are rearranged to duplicate in the vicinities of both edges of the omnidirectional video images so that any viewpoint can be extracted and displayed out of the entire video data.

Therefore, on the receiver side to receive such transport stream, it becomes possible to perform viewpoint-free reception. In other words, the viewer or user is enabled to extract any specified or desired field angle seamlessly from the omnidirectional video frames and to display the same. Thus, it is completely unnecessary for the viewer or user to be conscious that the video image being displayed is derived from which one of the video frames or from which one of the omnidirectional cameras.

According to a third aspect of the present invention, there is provided a video data processing apparatus or method for processing multi-angle video data obtained from a plurality of cameras, which are positioned to surround a subject in the space and shoot the subject from a plurality of visual angles. This video data processing apparatus or method includes means or step for generating video images of a first rectangular plane by sequentially pasting the video data from the individual cameras in accordance with the camera positioning order; means or step for generating a second rectangular plane by reducing the first rectangular plane to a size adapted to be contained in a predetermined encoding format; and means or step for generating a third rectangular plane by attaching dummy data to an unused region so that the second rectangular plane conforms with the predetermined picture compression format.

Here, the encoding format mentioned above may preferably be based on the HD (High Definition)-MPEG 2 (Moving Picture Experts Group 2) standards employed to carry video data as HDTV broadcast waves.

The video data processing apparatus or method according to the third aspect of the present invention may further include means or step for rendering bit-mapped serial file data where the third rectangular planes are arrayed in time series; and means or step for generating transport stream data by converting the data into predetermined output signals and compressing the same in conformity with the aforesaid encoding format.

According to a fourth aspect of the present invention, there is provided a data distributing apparatus or method for distributing multi-angle video data, which are obtained from a plurality of ambient cameras around a subject in the space by shooting the subject from a plurality of visual field angles, in such a manner that the viewpoint can be changed freely on the receiver side. This video data processing apparatus or method includes means or step for generating video images of a first rectangular plane by sequentially pasting the video data from the individual cameras in accordance with the camera positioning order; means or step for generating a second rectangular plane by reducing the first rectangular plane to a size adapted to be contained in a predetermined encoding format; means or step for generating a third rectangular plane by attaching dummy data to an unused region so that the second rectangular plane conforms with the predetermined picture compression format; means or step for rendering bit-mapped serial file data where the third rectangular planes are arrayed in time series; means or step for generating transport stream data by converting the rendered bit-mapped serial file data into predetermined output signals and compressing the same in conformity with the aforesaid encoding format; and means or step for transmitting the transport stream data.

The data distributing apparatus or method according to the fourth aspect of the present invention may further include means or step for attaching information to signify that the transport stream data are of viewpoint free type.

In the video data processing apparatus and method according to the third aspect of the present invention and in the data distributing apparatus and method according to the fourth aspect thereof, the multi-angle video data obtained from a plurality of ambient cameras around a subject in the space by shooting the subject from a plurality of visual field angles are processed through pasting, arrangement and reduction in a manner to conform with the size of the broadcast encoding format based on the HD-MPEG standard or the like, and dummy data are attached to unused regions.

Therefore, on the receiver side to receive such transport stream, it becomes possible to perform viewpoint-free reception. In other words, the viewer or user is enabled to extract any specified or desired picture angle from the multi-angle video frames and to display the same. Thus, it is completely unnecessary for the viewer or user to be conscious that the video image being displayed is derived from which one of the video frames or from which one of the multi-angle cameras.

According to a fifth aspect of the present invention, there is provided a storage medium where computer software is physically stored in a manner to be readable by a computer. The software is so described as to execute, on a computer system, a routine of processing the video data obtained from a plurality of cameras whose visual directions are set at a predetermined angular interval on one horizontal plane for shooting ambient pictures from one viewpoint in the space. The computer software contained in the storage medium includes a step of generating video images of a first rectangular plane by sequentially pasting the video data from the individual cameras in accordance with the camera positioning order; a step of generating a second rectangular plane by equally dividing the first rectangular plane into segments and then arranging the segments sequentially from top; a step of generating a third rectangular plane by duplicating a region of a predetermined area from the left or right edge of each segment at the edge of the other segment to be connected to the relevant one edge; a step of generating a fourth rectangular plane by reducing the third rectangular plane to a size adapted to be contained in a predetermined encoding format; and a step of generating a fifth rectangular plane by attaching dummy data to an unused region so that the fourth rectangular plane conforms with the predetermined picture compression format.

According to a sixth aspect of the present invention, there is provided a storage medium where computer software is physically stored in a manner to be readable by a computer. The software is so described as to execute, on a computer system, a routine of processing the multi-angle video data obtained from a plurality of ambient cameras around a subject in the space by shooting the subject from a plurality of visual angles. The computer software contained in the storage medium includes a step of generating video images of a first rectangular plane by sequentially pasting the video data from the individual cameras in accordance with the camera positioning order; a step of generating a second rectangular plane by reducing the first rectangular plane to a size adapted to be contained in a predetermined encoding format; and a step of generating a third rectangular plane by attaching dummy data to an unused region so that the second rectangular plane conforms with the predetermined picture compression format.

The storage medium according to each of the fifth and sixth aspects of the present invention is a medium for providing computer-readable software to a general-purpose computer system capable of executing various program codes. The storage medium is a removable and portable one such as, for example, CD (compact disc), FD (floppy disc) or MO (magneto-optical disc). The storage medium mentioned here may be any of package media, or a semiconductor memory or a magnetic disk where a program is stored temporarily or permanently. It is technically possible also to provide computer software to a specific computer system via a transmission medium such as a network (regardless of wire or wireless).

Such program storage medium defines the structural or functional cooperative relationship between the computer software and the storage medium for realizing the predetermined computer software function on a computer system. In other words, the cooperative function can be exhibited on the computer system by installing predetermined computer software in the computer system via the recording medium according to the fifth or sixth aspect of the present invention, hence achieving the same advantageous effects as those attained in the video data processing apparatus and method according to the first and third aspects of the present invention.

According to a seventh aspect of the invention, there is provided a computer program so described as to execute, on a computer system, a routine of processing the video data obtained from a plurality of cameras whose visual directions are set at a predetermined angular interval on one horizontal plane for shooting ambient pictures from one viewpoint in the space. The computer program includes a step of generating video images of a first rectangular plane by sequentially pasting the video data from the individual cameras in accordance with the camera positioning order; a step of generating a second rectangular plane by equally dividing the first rectangular plane into segments and then arranging the segments sequentially from top; a step of generating a third rectangular plane by duplicating a region of a predetermined area from the left or right edge of each segment at the edge of the other segment to be connected to the relevant one edge; a step of generating a fourth rectangular plane by reducing the third rectangular plane to a size adapted to be contained in a predetermined encoding format; and a step of generating a fifth rectangular plane by attaching dummy data to an unused region so that the fourth rectangular plane conforms with the predetermined picture compression format.

And according to an eighth aspect of the present invention, there is provided a computer program so described as to execute, on a computer system, a routine of processing the multi-angle video data obtained from a plurality of ambient cameras around a subject in the space by shooting the subject from a plurality of visual angles. The computer program includes a step of generating video images of a first rectangular plane by sequentially pasting the video data from the individual cameras in accordance with the camera positioning order; a step of generating a second rectangular plane by reducing the first rectangular plane to a size adapted to be contained in a predetermined encoding format; and a step of generating a third rectangular plane by attaching dummy data to an unused region so that the second rectangular plane conforms with the predetermined picture compression format.

In the computer program according to each of the seventh and eighth aspects of the present invention, there is defined a computer-readable program so described as to realize a predetermined processing routine executed on a computer system. In other words, the cooperative function can be exhibited on the computer system by installing, in the computer system, the computer program according to the seventh or eighth aspect of the invention, hence achieving the same advantageous effects as those attained in the video data processing apparatus and method according to the first and third aspects of the present invention.

The other objects, features and advantages of the present invention will become apparent from the following detailed description which will be given with reference to some preferred embodiments and the illustrative accompanying drawings.

BRIEF DESCRIPTION OF THE DRAWINGS

FIG. 1 is a perspective view showing the structure of an omnidirectional camera 10 capable of shooting omnidirectional video images simultaneously through 360° from one viewpoint specified in the space;

FIG. 16 is a flowchart of a processing routine realized by video stream reproducing software executed on the receiver side; and FIG. 17 is a diagram showing the definition of coordinate axes in displaying the received video data on a TV monitor.

DETAILED DESCRIPTION OF THE PREFERRED EMBODIMENTS

Hereinafter some preferred embodiments of the present invention will be described in detail with reference to the accompanying drawings.

A. 360° Video Viewpoint-free Broadcasting

First, in an example to be explained as a preferred embodiment of the invention, 360° video images obtained from an omnidirectional camera are transmitted as viewpoint-free video images, wherein the camera is a type capable of simultaneously shooting ambient omnidirectional video images from one viewpoint in the space. According to this embodiment, as will be mentioned later, it is possible, on the receiver or user side, to extract and watch any video frame of a desired viewpoint out of the entire omnidirectional video images.

FIG. 1 is a perspective view showing the structure of an omnidirectional camera 10 applied to this embodiment, wherein the camera is capable of simultaneously shooting ambient omnidirectional video images through 360° from one viewpoint in the space.

As shown in this diagram, the omnidirectional camera 10 includes eight cameras 11A to 11H arrayed substantially at equal intervals in a predetermined circumferential direction, and a reflector 12 where eight plane mirrors positioned in the respective visual directions of the eight cameras 11A to 11H are arranged on an octagonal pyramid. In this embodiment, the cameras 11A to 11H are so positioned that the respective projection centers thereof are mutually coincident in the vicinity of the center of the omnidirectional camera 10 and also that the respective visual directions of the cameras 11A to 11H are spaced apart at predetermined angular intervals on one horizontal plane.

Due to shooting the ambient scenes reflected by the plane mirrors relevant respectively to the cameras 11A to 11H, the reflected video images can be shot through 360° horizontally by the omnidirectional camera 10 as a whole.

If a VTR is connected to each of the cameras 11A to 11H, a total of eight video (and audio) streams can be recorded. And one stream of horizontally 360° omnidirectional video images can be generated by taking the video streams, which have been recorded by the cameras 11A to 11H, as computer data (bit-mapped file data) via a video capture card into a computer and then pasting the eight streams of video images from the cameras.

At the time point when the camera video images recorded by the VTR have been captured as bit-mapped file data by the computer, one frame of video image in one video stream is displayed as a still picture composed of 720×480 pixels.

Figure 2:
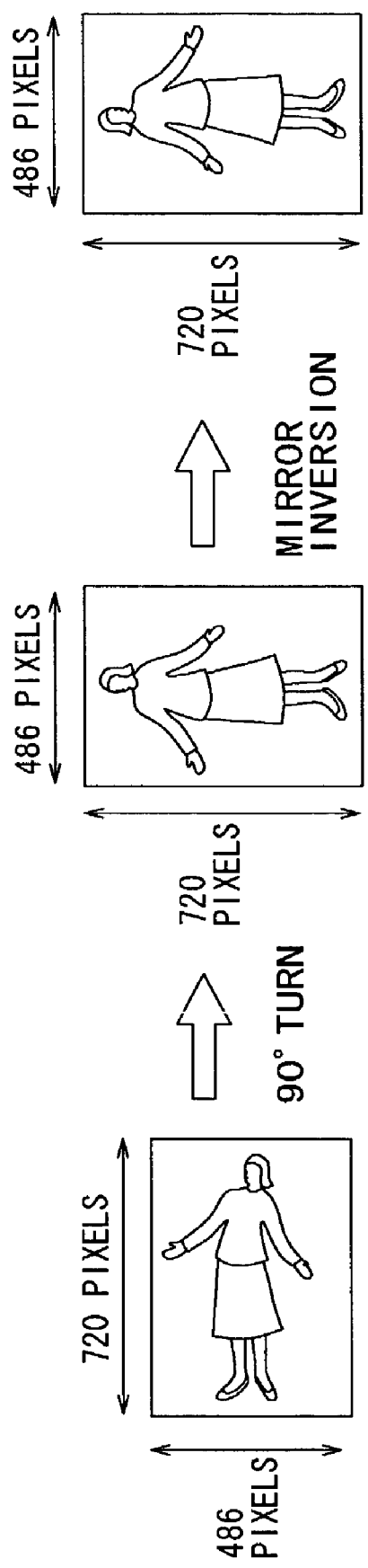
FIG. 2 shows an example of 90° turn and mirror inversion of a video image executed prior to pasting eight video streams together.

In the structure of the omnidirectional camera 10 shown in FIG. 1, the video images obtained from the cameras 11A to 11H are recorded with turn of 90°. For the purpose of attaining coincidence between the camera angle relationship and the viewpoints of the eight cameras 11A to 11H, the eight video streams are processed, prior to being pasted, through 90° turn and mirror inversion as illustrated in FIG. 2.

Figure 3:
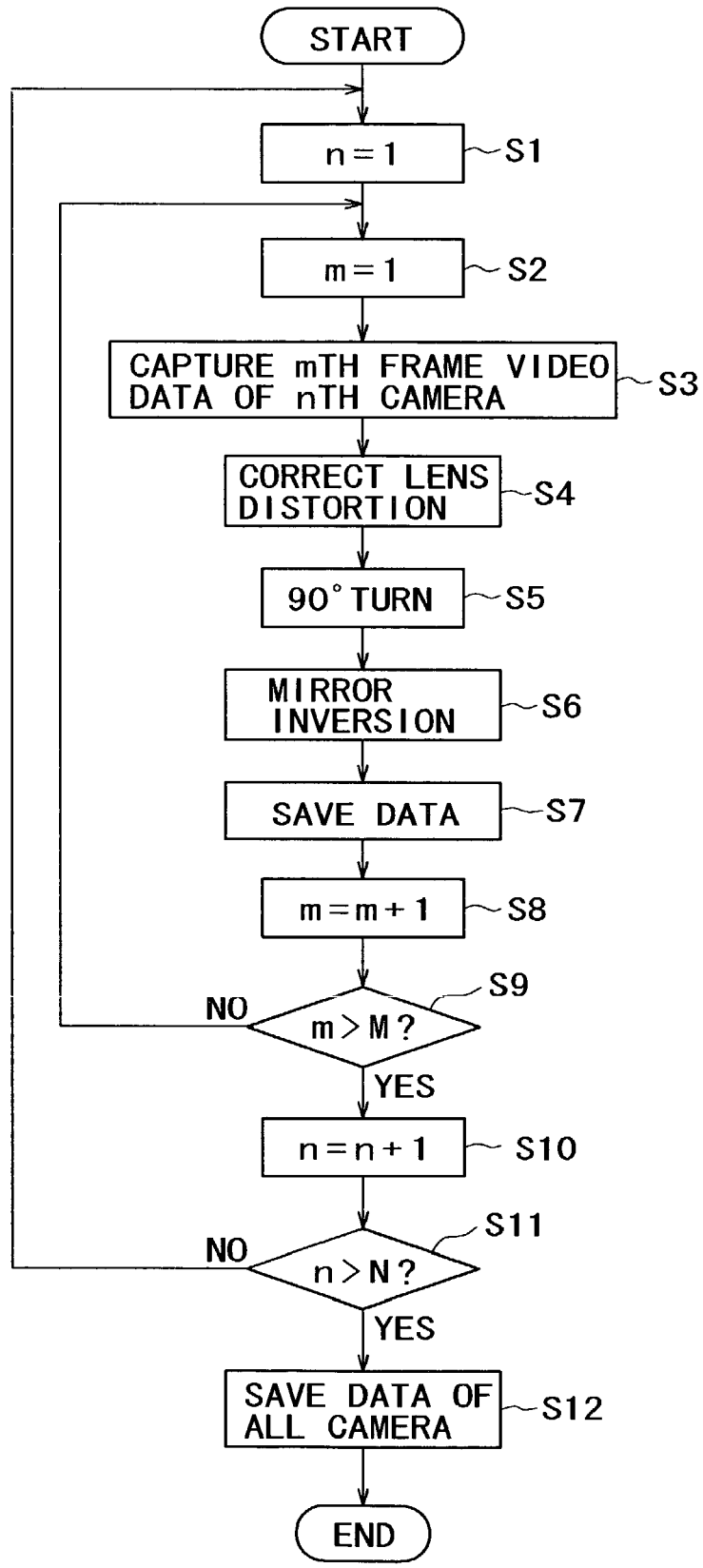
FIG. 3 is a flowchart showing a processing routine to perform 90° turn and mirror inversion with regard to M frames of video material data obtained from eight cameras 11A to 11H.

FIG. 3 is a flowchart showing a processing routine to execute such 90° turn and mirror inversion with regard to M frames of the video material data obtained from the eight cameras 11A to 11H. For example, this processing routine is realized by executing a predetermined control program in a computer where the video frames from the individual cameras 11A to 11H are captured. In this routine, n and m denote variables introduced for counting the numbers of the cameras and the frames respectively.

First, an initial value 1 is substituted for each of the variables n and m (steps S1, S2). And the video data of the mth frame of the nth camera are captured (step S3).

Then the lens distortion is corrected on the basis of the distortion parameter of the nth camera to the captured bit-mapped video frame (step S4).

And subsequently, as shown in FIG. 2, 90° turn (step S5) and mirror inversion (step S6) are executed with regard to the bit-mapped video frame posterior to such correction of the lens distortion, and the data are saved in a hard disk device or the like (step S7).

Thereafter, m is incremented by 1 (step S8), and if the number m of frames is less than the maximum number M of frames (step S9), the operation returns to step S3, and the above routine of processing the video frame data is executed repeatedly.

On the other hand, if the number of the processed frames with regard to the nth camera is equal to the predetermined number M, then n is incremented by 1 (step S10). Meanwhile, if n is less than 8 (step S11), the operation returns to step S2, and the above routine of processing the video frame data with regard to the next camera is executed repeatedly.

When the data relevant to the entire eight cameras 11A to 11H have been processed, the data are saved (step S12), and the whole routine is completed.

Figure 4:
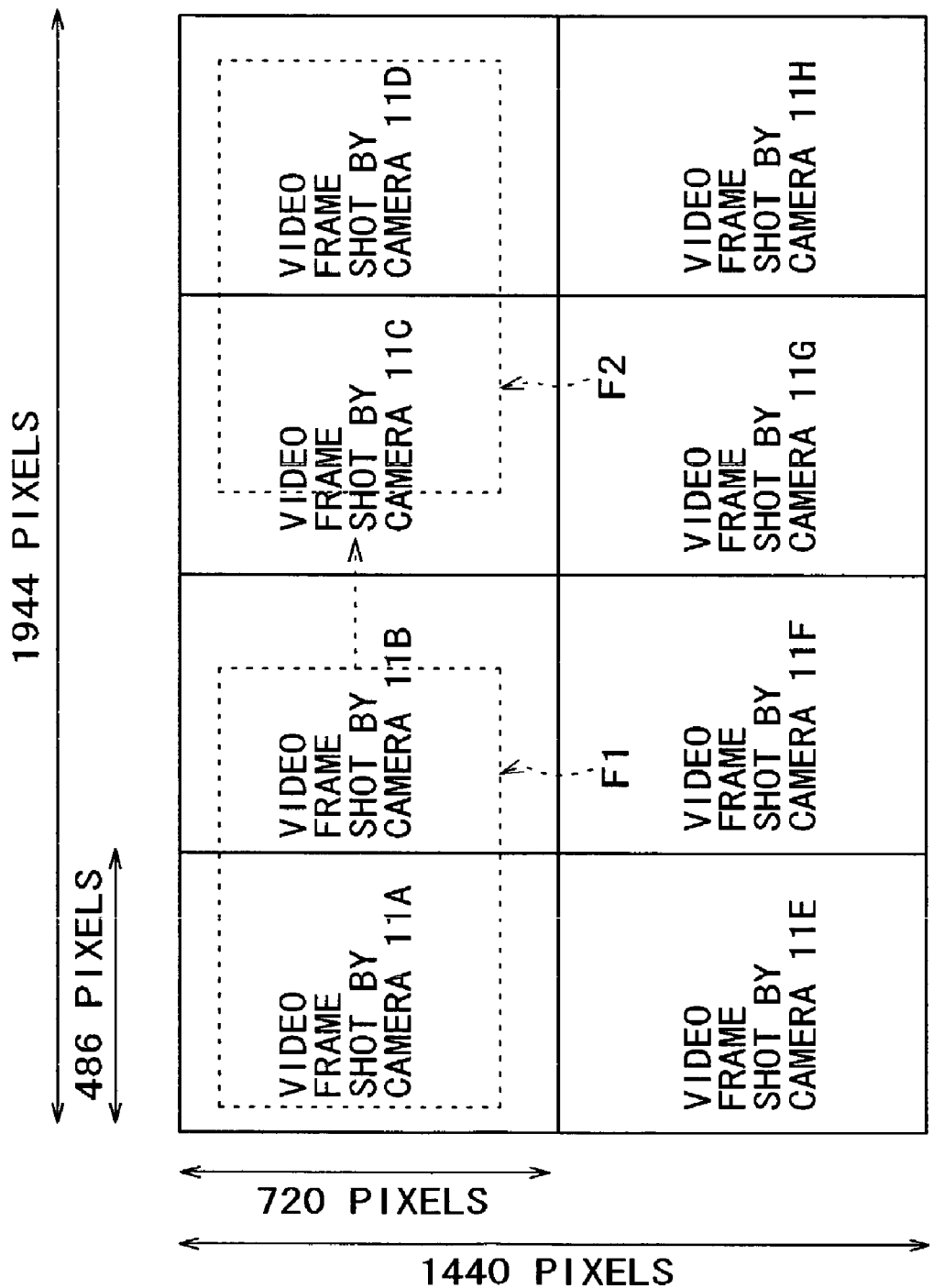
FIG. 4 shows how one frame is generated by pasting eight synchronized video frames of the cameras 11A to 11H in accordance with the respective positions of the cameras 11A to 11H.

After the video frame data from the individual cameras 11A to 11H have been processed as shown in FIG. 3, the eight synchronized video frames of the cameras 11A to 11H are pasted together as shown in FIG. 4, whereby a single frame is generated. In this case, the video frames are arranged on a cylindrical lateral plane in accordance with the positioning order (refer to FIG. 1) of the cameras 11A to 11H that constitute the omnidirectional camera 10, hence enabling the pasted video frames to represent a 360° omnidirectional video image shot by the omnidirectional camera 10.

When such omnidirectional video frames are distributed via terrestrial broadcasting, satellite broadcasting, cable television broadcasting, high definition television broadcasting or the like, it is possible, on the receiver side, to extract and display any field angle specified by the viewer or user out of the received omnidirectional video frames, so that the user can selectively view any desired field angle seamlessly out of the entire omnidirectional scenes without being conscious that the video image being displayed is derived originally from which one of the cameras 11A to 11H. For example, when a field angle F1 has been specified by the viewer or user in the omnidirectional video frames shown in FIG. 4, the video frame corresponding thereto is extracted and displayed on the receiver, but it is not necessary for the user to be conscious that the video image being displayed is formed by connecting the video frames shot by the cameras 11A and 11B. Similarly, in case the field angle has been changed to F2, the video frame corresponding thereto is extracted and displayed on the receiver, but the viewer or user need not be conscious that the video image being displayed is formed by connecting the video frames shot. by the cameras 11C and 11D.

However, when such video frames are to be distributed via terrestrial broadcasting, satellite broadcasting, cable television broadcasting, high definition television broadcasting or the like, the video frames are composed of a huge amount of data, and therefore the video data are compressed in conformity with, e.g., the HD (High Definition)-MPEG 2 (Moving Picture Experts Group 2) format. In this case, it is necessary to approximate the aspect ratio to the above video data compression format, since the omnidirectional video images need to conform with the size of the HD-MPEG2 format. For this reason, the omnidirectional video images, where the video frames shot respectively by the cameras 11A to 11H are arranged on a cylindrical lateral plane, are divided equally into two, and the divided second-half frame part is rearranged to be placed under the first-half frame part, as shown in FIG. 4.

Due to such division and rearrangement of the video frames, the originally successive frames obtained from the cameras 11A and 11H, and the originally successive frames obtained from the cameras D and E, are rearranged at mutually spaced positions, as shown in FIG. 4, on the omnidirectional video frames for data distribution.

In this case, if the field angle of the omnidirectional video image is shifted on the receiver side, it is difficult to achieve seamless switching of the regions astride the video frames of the cameras H and A, or the regions astride the video frames of the cameras D and E.

Therefore, this embodiment is so contrived that, when the omnidirectional video frames on a cylindrical lateral plane are divided and rearranged, the video frame of the adjacent camera is pasted additionally to one edge of the divided video frame. That is, the video frames are rearranged in such a manner that the pasted video frame of the camera is duplicated in the vicinities of both edges of the omnidirectional video image.

Figure 5:
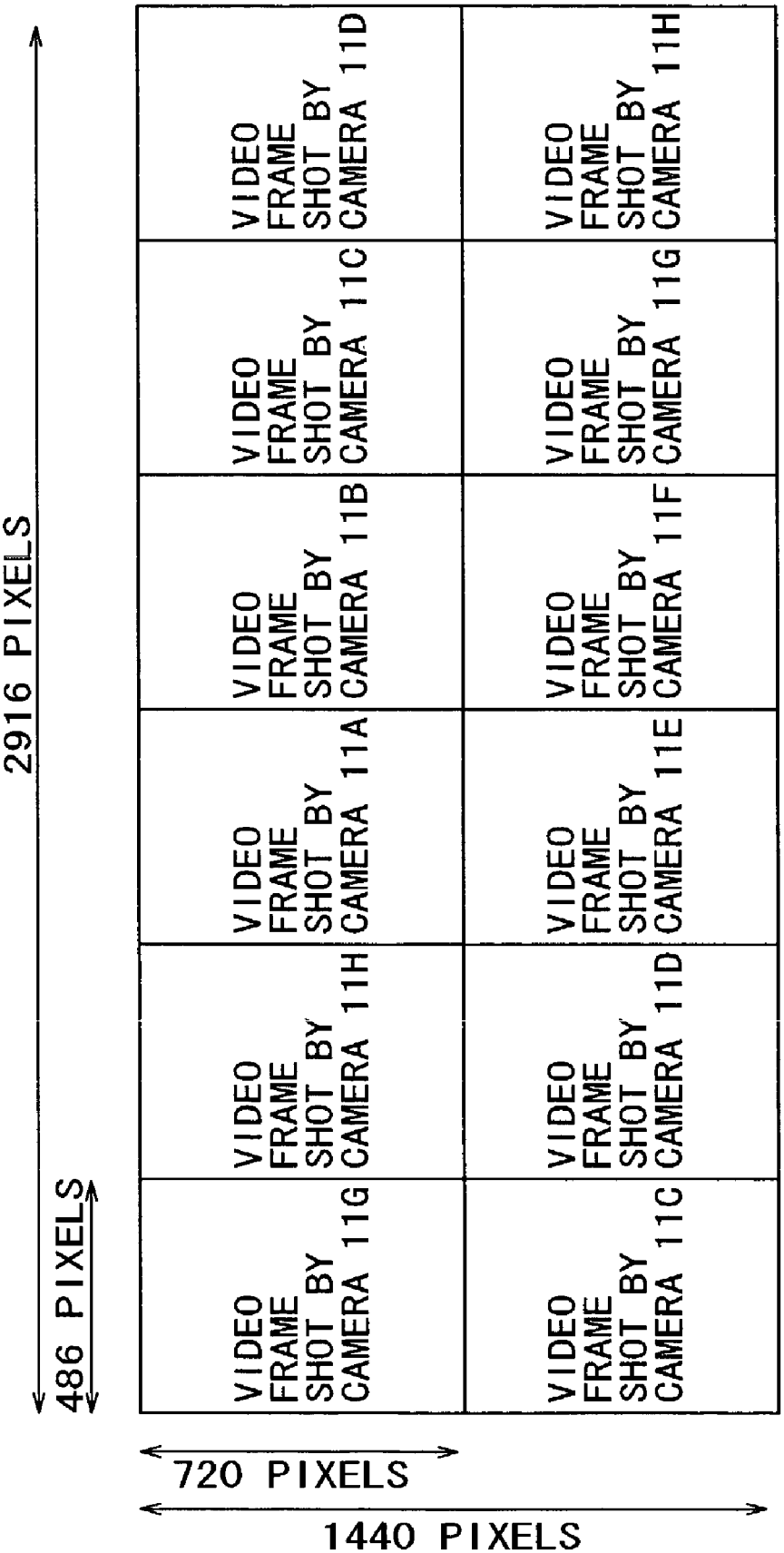
FIG. 5 shows an example of omnidirectional video frames formed for distribution at the time of division and rearrangement of the omnidirectional video frames on a cylindrical lateral plane, by pasting an extra video frame of the adjacent camera to one edge of the divided frame.

FIG. 5 shows omnidirectional video frames for distribution formed by additionally pasting the video frame of the adjacent camera to one edge of the divided video frame at the time of dividing and rearranging the omnidirectional video frames on a cylindrical lateral plane.

In the example of this diagram, for the purpose of conforming the data finally with the size of the HD-MPEG2 format inclusive of attaining the same aspect ratio, the video frame of the camera 11H adjacent to the camera 11A, and the video frame of the camera 11G adjacent to the camera 11H, are pasted successively to the front of the first half of the divided omnidirectional video frames, and similarly the video frame of the camera 11D adjacent to the camera 11E, and the video frame of the camera 11C adjacent to the camera 11D, are pasted successively to the front of the second half of the divided omnidirectional video frames.

Consequently, with regard to the omnidirectional video frames shown in the diagram, the video frames of the cameras 11C and 11D are duplicated in the first and second halves, and also the video frames of the cameras 11G and 11H are duplicated in the first and second halves.

In this embodiment, the data size is reduced for distributing the omnidirectional video frames shown in FIG. 5, and the dummy data are attached thereto to conform the video data with the HD-MPEG size (1920×1080 pixels) (refer to FIG. 6), thereby generating a bit-mapped serial file group where one bit-mapped file is composed of one frame.

Figure 6:
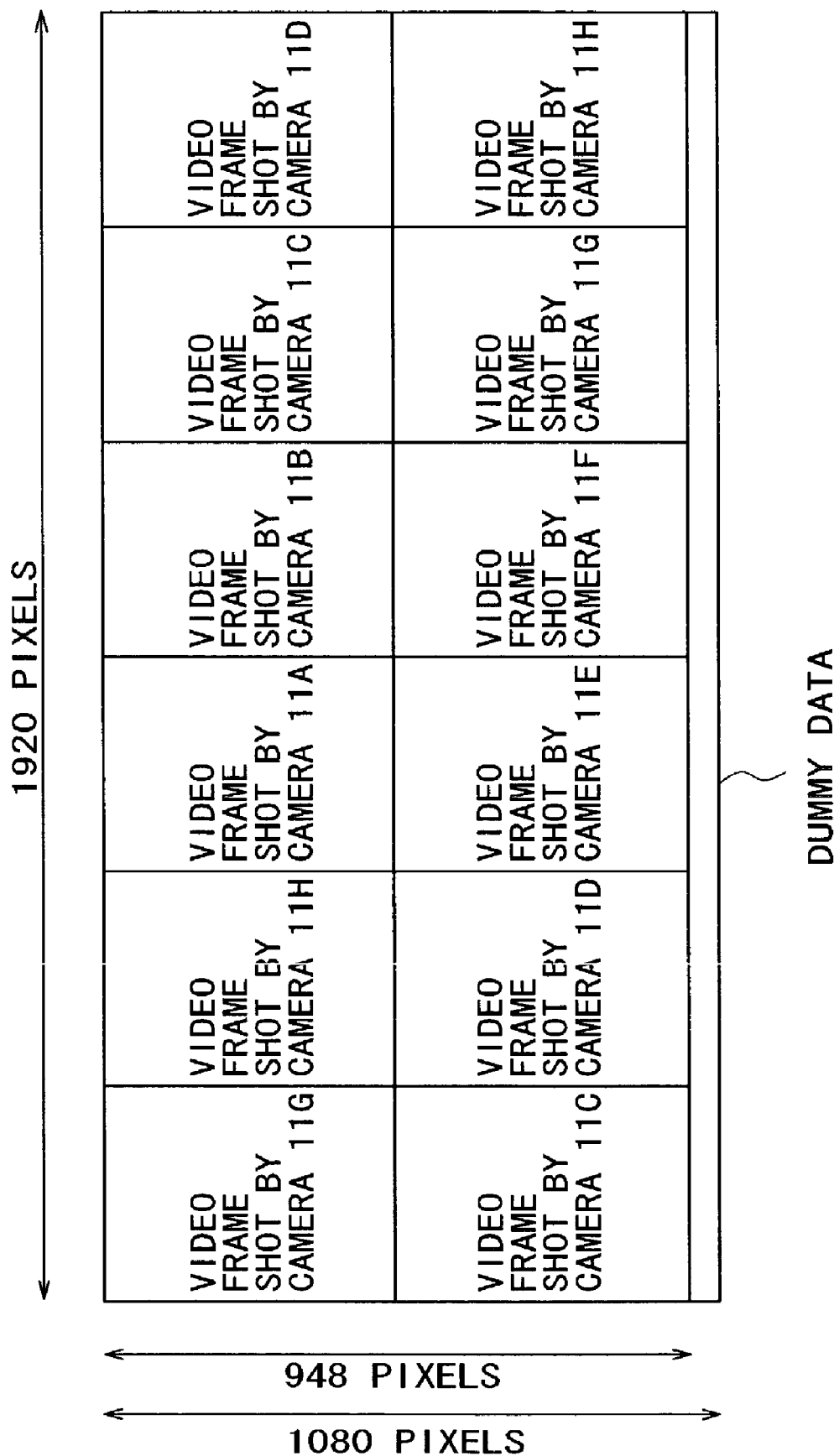
FIG. 6 shows how the data size of the omnidirectional video frames shown in FIG. 5 is reduced and equalized to the HD-MPEG size (1920×1080 pixels) with additional attachment of dummy data thereto.

The bit-mapped serial file data formed as shown in FIG. 6 are rendered on a computer to be converted into output signals of an HD-SDI (Serial Digital Interface), which are then encoded and compressed by an MPEG2 hardware encoder, whereby transport stream data conforming with the HD-MPEG2 format are generated.

Figure 7:
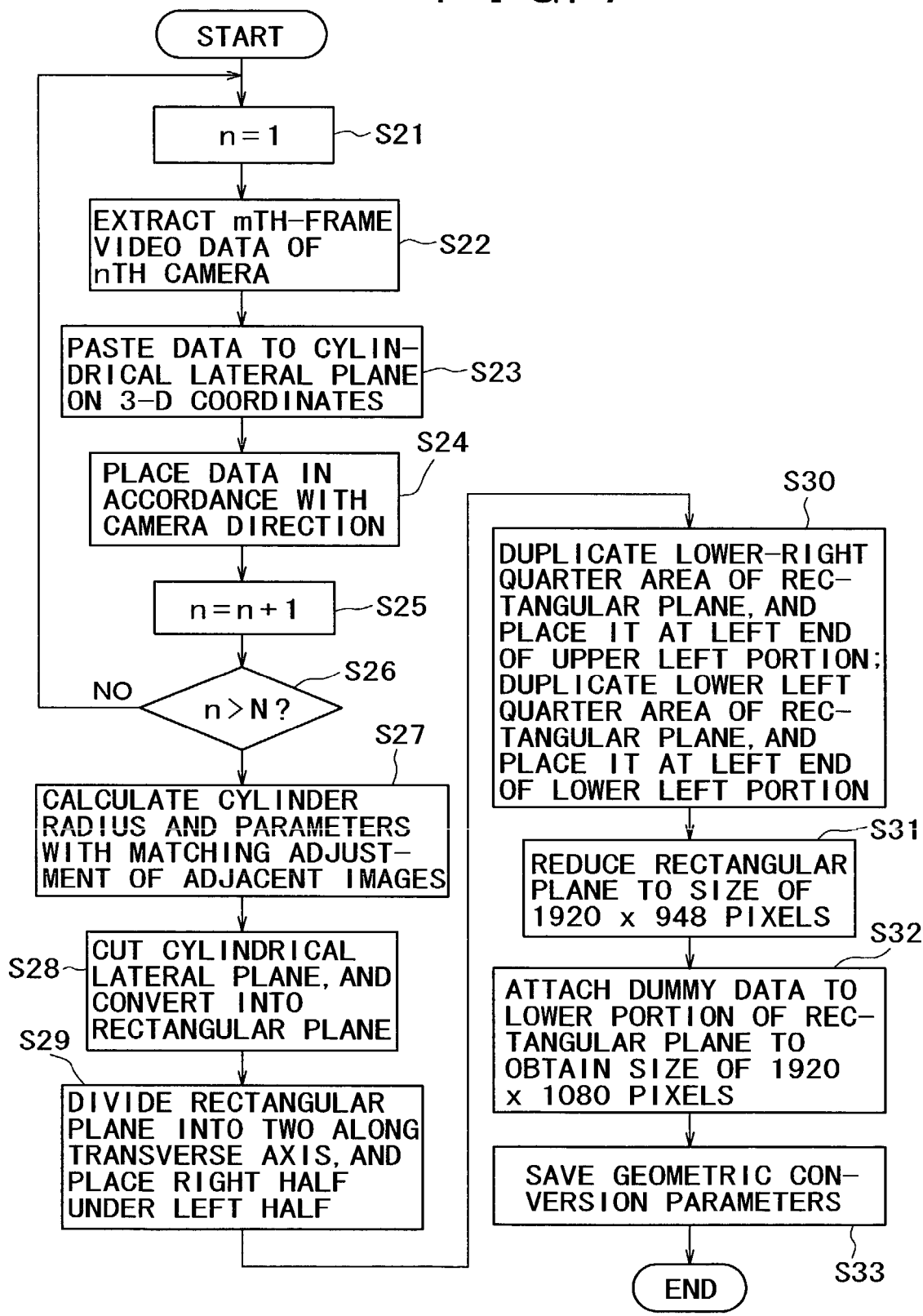
FIG. 7 is a flowchart showing a processing routine to generate, out of the video frames obtained from the cameras 11A to 11H, bit-mapped serial file data (omnidirectional video frames for distribution) of the format shown in FIG. 6.

FIG. 7 is a flowchart of a processing routine for generating such bit-mapped serial file data (omnidirectional video frames for distribution) of FIG. 6 from the video frames of the individual cameras 11A to 11H captured and processed in accordance with the aforementioned routine of FIG. 3. This processing routine is realized by, for example, capturing the video frames of the individual cameras 11A to 11H and executing a predetermined control program on a computer.

First, an initial value 1 is substituted for the variable n (step S21). Then, out of the entire data saved through 90° turn and mirror inversion (refer to step S12 in FIG. 3), the mth-frame video data of the nth camera are extracted (step S22).

Subsequently, the mth-frame video data of the nth camera thus extracted are pasted onto a cylindrical lateral plane in a three-dimensional coordinate system (step S23). This process is realized by plane-to-surface conversion.

Further, the video data pasted onto the cylindrical lateral plane are arranged and placed in accordance with the camera direction (step S24).

Thereafter the variable n is incremented by 1 (step S25), and if n is less than 8 (step S26), the operation returns to step S22, and the foregoing process of pasting the video frame onto the cylindrical lateral plane is executed repeatedly with regard to the video frame of the next camera.

When the video frames of the entire eight cameras 11A to 11H have been pasted onto the cylindrical lateral plane, the radius of the cylinder and other parameters are calculated with matching adjustment of the adjacent images (step S27).

Next, the cylindrical lateral plane is cut and converted into a rectangular plane (step S28).

Further, this rectangular plane is divided along a half line in the transverse direction (camera positioning direction), and the right half of the divided plane is placed under the left half thereof (step S29).

Subsequently, a lower-right quarter area of the rectangular plane placed at step S29 is duplicated and placed at the left edge of the upper left portion, while an upper-right quarter area of the rectangular plane is duplicated and placed at the left edge of the lower left portion (step S30).

Thereafter the rectangular plane including the duplicate portion at the left edge is reduced to a size of 1920×948 pixels so as to conform with the size of the HD-MPEG format (step S31).

Then dummy data are attached to the lower portion of the rectangular plane reduced to the size of 1920×948 pixels, thereby generating data of 1920×1080 pixels which conform with the HD-MPEG format (step S32).

And finally, the geometric conversion parameters obtained at steps S22 to S32 are saved (step S33), and thus the processing routine is completed.

Figure 8:
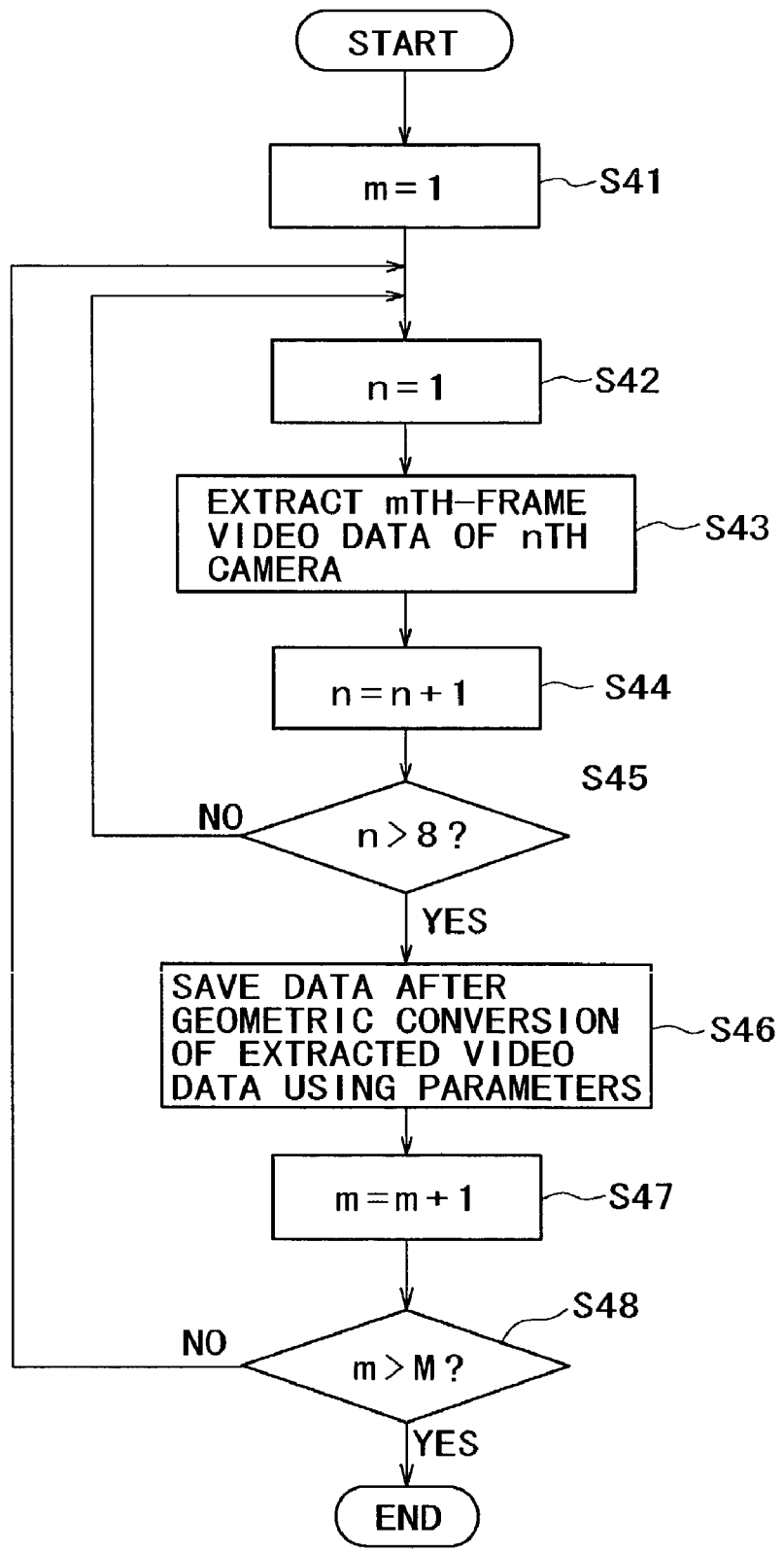
FIG. 8 is a flowchart showing a processing routine to render the omnidirectional video frames formed into a bit-mapped serial file in accordance with the routine of FIG. 7.

FIG. 8 is a flowchart of a processing routine for rendering the omnidirectional video frames obtained as bit-mapped serial file data in accordance with the aforementioned routine of FIG. 7. This processing routine is realized by, for example, capturing the video frames of the individual cameras 11A to 11H and executing a predetermined control program on the computer.

First, an initial value 1 is substituted for each of the variables m and n (steps S41, S42).

Then the mth-frame video data of the nth camera are extracted from the bit-mapped serial files (step S43).

Subsequently, the variable n is incremented by 1 (step S44), and if n is less than 8 (step S45), the operation returns to step S42, and the mth-frame video data of the next camera are taken out.

When the mth-frame video data of the entire eight cameras 11A to 11H have been completely taken out, the video data are saved after geometric conversion using the parameters stored at step S33 in FIG. 7 (step S46).

Thereafter the variable m is incremented by 1 (step S47), and if m denoting the number of frames is less than the maximum number M (step S48), the operation returns to step S42, and the geometric conversion is executed repeatedly with regard to the above video data.

And when such geometric conversion has been terminated with regard to the entire video data, this processing routine is completed.

Transport stream data of the HD-MPEG2 format can be generated by first producing bit-mapped serial files from the omnidirectional video frames for distribution (refer to FIG. 6) generated in accordance with the processing routine of FIG. 7, then rendering the serial files on a computer in accordance with the processing routine of FIG. 8 to thereby convert the same into HD-SDI (Serial Digital Interface) output signals, and compressing such output signals by an MPEG2 hardware encoder.

On the receiver side to receive the transport stream data, it is possible to perform viewpoint-free reception as will be described later. That is, the viewer or user is enabled to extract any desired field angle seamlessly from the entire omnidirectional frames and to display the extracted field angle. It is completely unnecessary for the viewer or user to be conscious that the video image being displayed is derived from which one of the video frames or from which one of the omnidirectional camera 10.

In broadcasting the omnidirectional video frames mentioned above and performing viewpoint-free reception on the receiver side, some data need to be sent for identifying that the video frame data are omnidirectional ones.

In the known satellite broadcasting, there exist PSI (Program Service Information) data to prescribe the kind of the broadcast data and so forth. Therefore, if a flag is additionally attached to indicate that the relevant broadcast program is composed of 360° omnidirectional video images, it becomes possible on the receiver side to enable viewpoint-free reception by identifying the flag while activating an undermentioned cursor key. (A portion of the transmission control signal standardized according to the ISO/IEC13818-1 is termed PSI. The PSI data are composed of four kinds of tables (PAT, CAT, PMT, NIT) which are transmitted in the form of section.)

In receiving the omnidirectional video images, since the video data conform with the HD-MPEG, there is no necessity of remodeling the video data transmitting structure.

Meanwhile on the receiver side to receive the omnidirectional video data, when the data are confirmed to be omnidirectional video images by checking the PSI data, then the video images of default camera positions are extracted. For example, the video images shot by mutually adjacent cameras 11A and 11B are set as those at the default positions.

As for the method of extracting the video image to be displayed from the entire omnidirectional video images, driving software (device driver) of the MPEG decoder in the present receiver is remodeled so that any desired region can be displayed in accordance with the XY coordinates of the display region specified by the user.

In case the user wants to change the viewpoint, the user specifies display start coordinates (Start) and display end coordinates (End) in accordance with the motion of a cursor on a remote controller or that of a control panel of the receiver, thereby scrolling the display region in the omnidirectional video images.

Similarly, in the case of zooming, the user specifies display start coordinates and display end coordinates after calculation of the display region reduction ratio corresponding to the time of depression of a decision key in the remote controller or that of a decision key on the control panel of the receiver, and displays such coordinates.

B. One-channel Multi-angle Broadcasting

Next, an explanation will be given on an example of transmitting multi-angle video images obtained from a plurality of cameras, which surround a subject in the space, by shooting the subject at a plurality of visual field angles.

Figure 9:
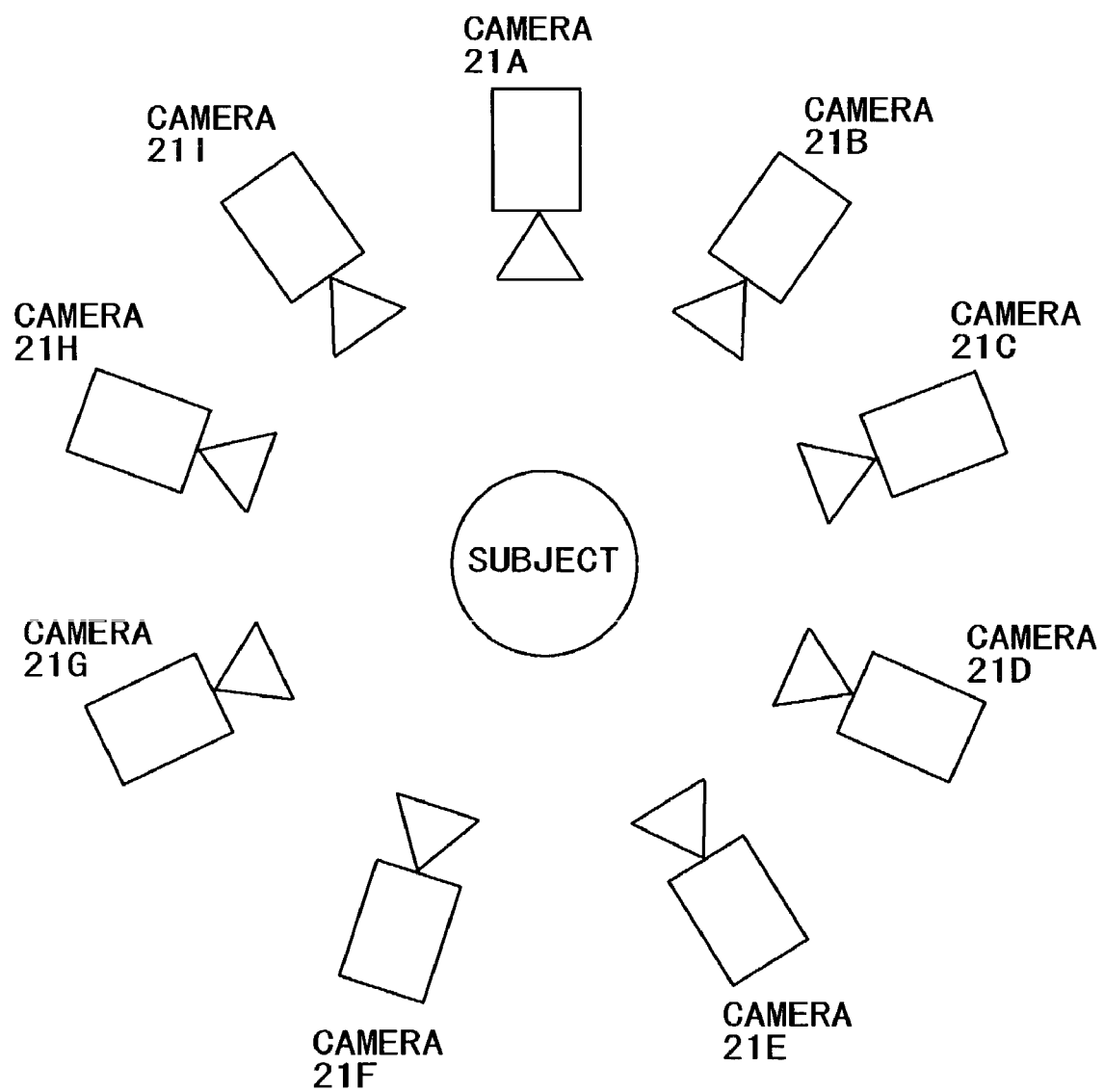
FIG. 9 is a diagram showing the structure of a multi-angle camera to shoot a subject from a plurality of visual angles.

FIG. 9 shows the structure of a multi-angle camera 20 applied to this embodiment for shooting a subject from a plurality of visual field angles. As shown in this diagram, the multi-angle camera 20 consists of nine cameras 21A to 21I positioned substantially at equal intervals in the circumferential direction around a specific subject in a manner to surround the subject.

A total of nine video (and audio) streams can be recorded by connecting a VTR to each of the cameras 21A to 21I. And the video streams recorded by the cameras 21A to 21I are taken into a computer as computer data (bit-mapped files) via a video capture card, so that the nine video images from the cameras are pasted together to thereby generate a multi-angle video image from nine directions with regard to the subject.

At the time when the video images obtained from the cameras and recorded by the VTR have been captured as bit-mapped file data by the computer, the video image of one frame in one video stream is represented as a still picture composed of 720×480 pixels. The video data from the nine cameras 21A to 21I are pasted together in the camera positioning order (refer to FIG. 8) around the subject, so that the multi-angle video images are formed into one frame as shown in FIG. 10.

Figure 10:
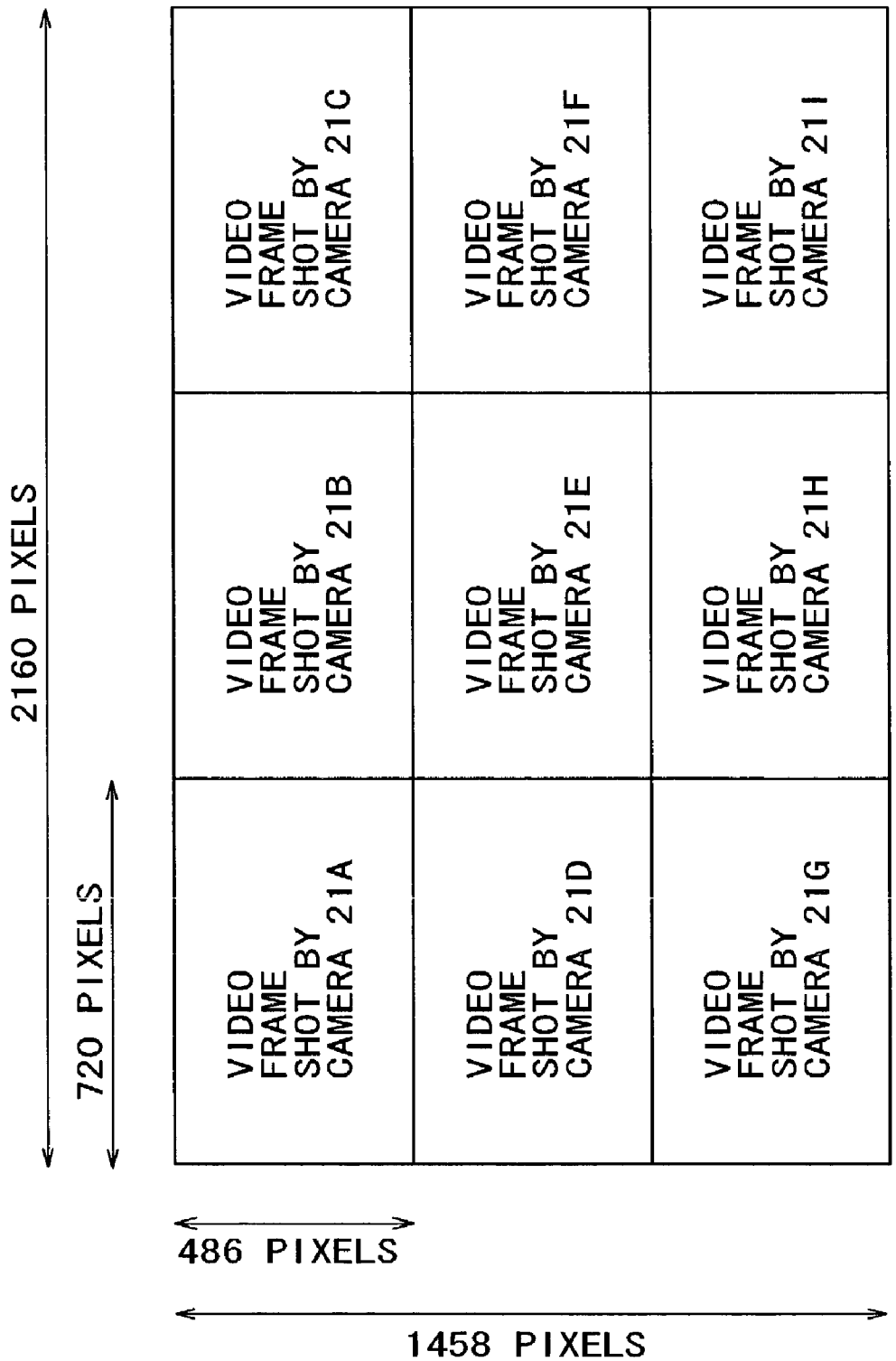
FIG. 10 shows how one frame is generated by pasting nine synchronized video frames, which are obtained from cameras constituting the multi-angle camera and positioned around a subject, in accordance with the positioning order of the cameras.
Figure 11:
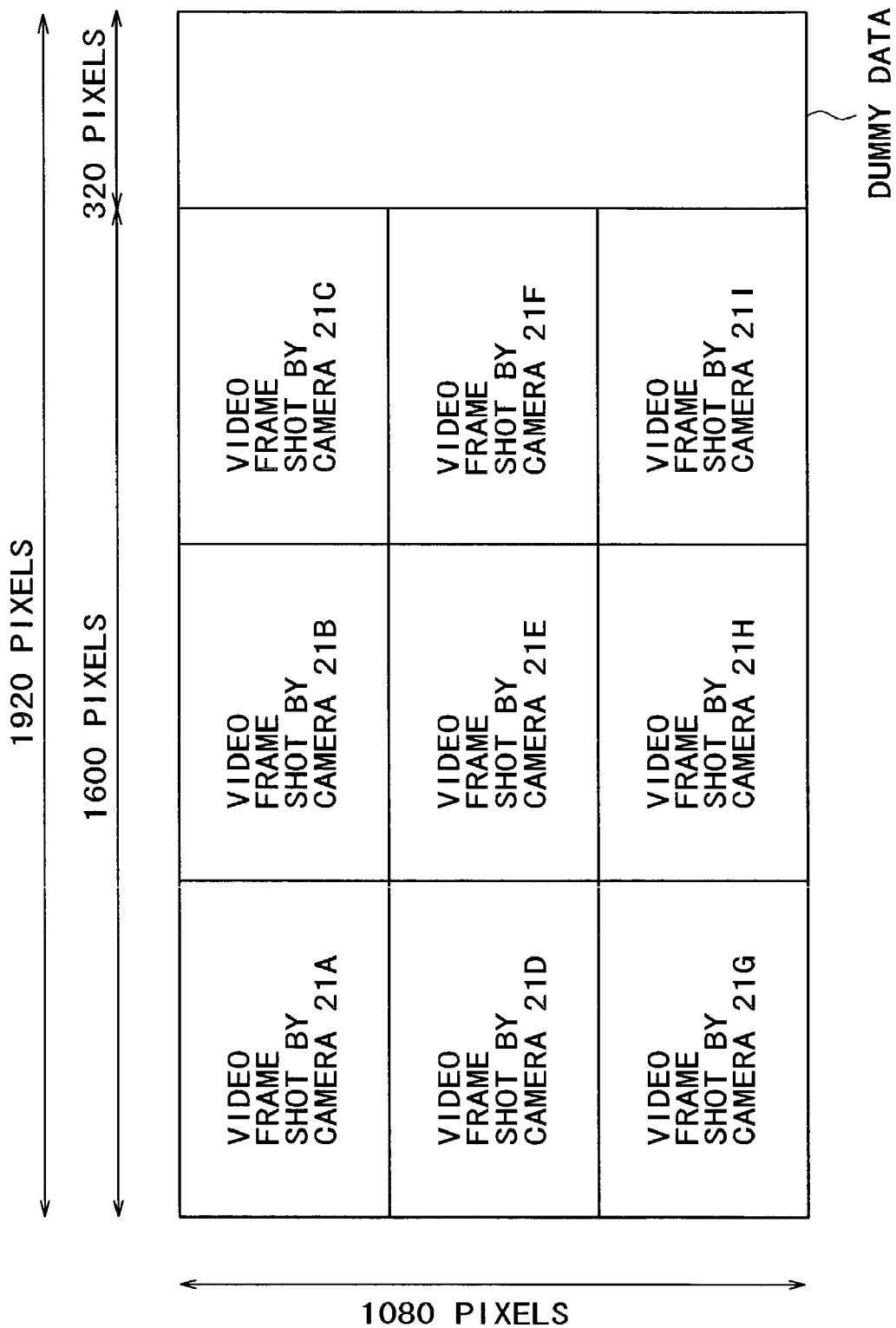
FIG. 11 shows how the aspect ratio is adjusted and equalized to the HD-MPEG size (1920×1080 pixels) by additionally attaching dummy data to the multi-angle video frames shown in FIG. 9.

In this embodiment, for the purpose of distributing the multi-angle video data of FIG. 10 in conformity with the prescribed HD-MPEG size (1920×1080 pixels), dummy data are additionally attached as shown in FIG. 11 to thereby equalize the aspect ratio with adjustment of the reduction ratio, hence generating a bit-mapped serial file group where one bit-mapped file is composed of one video frame of the nine cameras.

Figure 12:
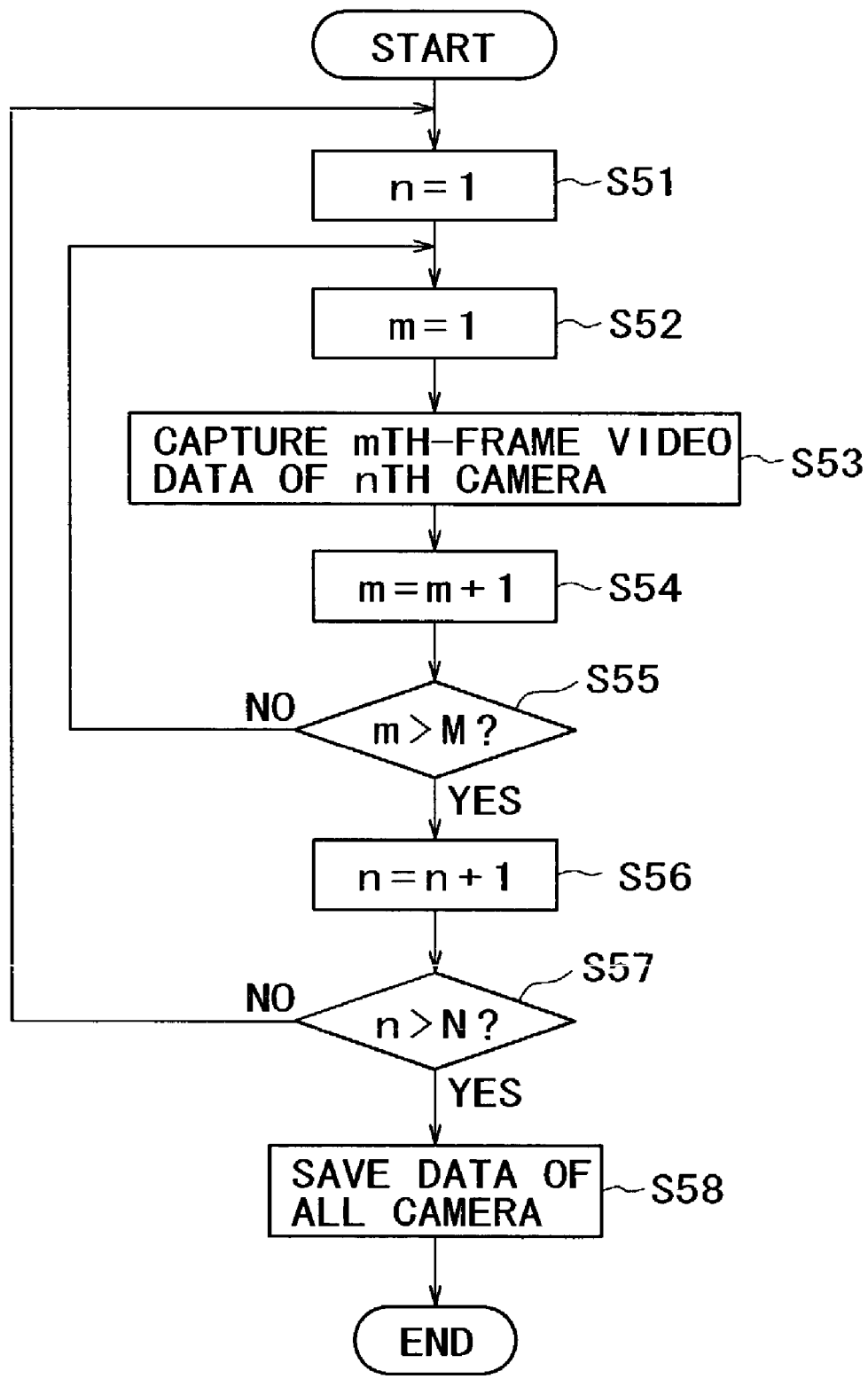
FIG. 12 is a flowchart showing a processing routine to capture, in generation of the multi-angle video data, the data of M frames out of the video material data obtained from the nine cameras.

FIG. 12 is a flowchart of a processing routine for capturing, in generation of multi-angle video data, the data of M frames of the video material data obtained from the nine cameras 21A to 21I. This processing routine is realized by, for example, capturing the video frames of the individual cameras 21A to 21I and executing a predetermined control program on the computer.

First, an initial value 1 is substituted for each of the variables m and n (steps S51, S52). Then, the mth-frame video data of the nth camera are captured (step S53).

Subsequently, the variable m is incremented by 1 (step S54), and if m denoting the number of frames is less than the maximum number M (step S55), the operation returns to step S53, and the process of taking out the video data of the next frame is executed repeatedly.

In case the number of the processed frames regarding the nth camera has reached the predetermined value M, the variable n is incremented by 1 (step S56). Meanwhile, in case n is less than 8 (step S57), the operation returns to step S52, and the process of taking out the video data is executed repeatedly with regard to the video frame of the next camera.

When the video data of the entire nine cameras 21A to 21I have been taken out, the video data are saved (step S58), and this processing routine is completed.

Figure 13:
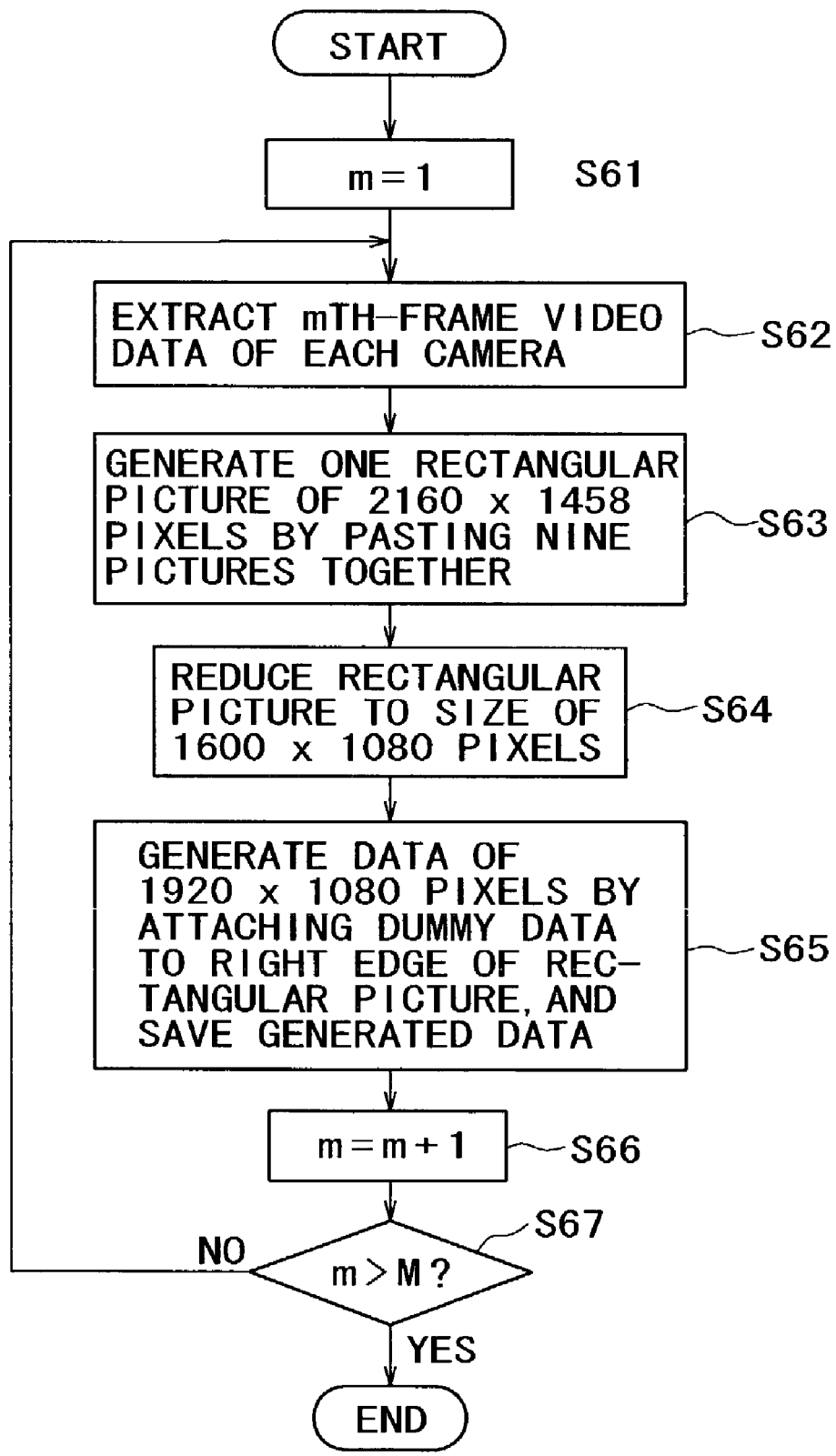
FIG. 13 is a flowchart showing a processing routine to render, in generation of the multi-angle video data, the video data by pasting the video material data obtained from the nine cameras.

FIG. 13 is a flowchart of a processing routine for rendering, in generation of multi-angle video data, the video data by pasting together the video material data obtained from the nine cameras 21A to 21I. This processing routine is realized by, for example, capturing the video frames of the individual cameras 21A to 21I and executing a predetermined control program on the computer.

First, an initial value 1 is substituted for the variable m (step S61), and then the mth-frame video data of the individual cameras 21A to 21I are taken out of the data saved at step S58 of FIG. 12 (step S62).

Subsequently, the nine pictures thus taken out are pasted together to generate a rectangular picture (2160×1458 pixels) as shown in FIG. 10 (step S63).

Thereafter, this rectangular picture is reduced to a size of 1600×1080 pixels (step S64), and further dummy data are additionally attached to the right edge of the rectangular picture, thereby generating data of 1920×1080 pixels that conform with the HD-MPEG format, and the data thus generated are saved (step S65).

Then the variable m is incremented by 1 (step S66), and if m denoting the number of frames is less than the maximum number M (step S67), the operation returns to step S62, and the above process of pasting the video frame data is executed repeatedly.

And when the entire video data have been pasted together, this processing routine is completed.

Transport stream data of the HD-MPEG2 format can be generated by first rendering, on the computer, the bit-mapped serial file data of FIG. 11 in accordance with the processing routine of FIGS. 12 and 13, then converting the same into HD-SDI (Serial Digital Interface) output signals, and compressing such output signals by an MPEG2 hardware encoder.

On the receiver side to receive the transport stream data, it is possible to perform viewpoint-free reception as will be described later. That is, the viewer or user is enabled to extract any desired field angle from the entire multi-angle video frames and to display the extracted field angle. It is completely unnecessary for the viewer or user to be conscious that the video image being displayed is derived from which one of the video frames or from which one of the multi-angle camera 20.

In broadcasting the multi-angle video frames mentioned above and performing viewpoint-free reception on the receiver side, some data need to be sent for identifying that the video frame data are multi-angle ones.

In the known satellite broadcasting, there exist PSI (Program Service Information) data to prescribe the kind of the broadcast data and so forth. Therefore, as in the case of transmitting 360° omnidirectional video images, if a flag is additionally attached to indicate that the relevant broadcast program is composed of multi-angle video images, it becomes possible on the receiver side to enable viewpoint-free reception by identifying the flag while activating an undermentioned cursor key. (A portion of the transmission control signal standardized according to the ISO/IEC13818-1 is termed PSI. The PSI data are composed of four kinds of tables (PAT, CAT, PMT, NIT) which are transmitted in the form of section.)

In receiving the multi-angle video images, since the video data conform with the HD-MPEG, there is no necessity of remodeling the video data transmitting structure.

Meanwhile on the receiver side to receive the multi-angle video data, when the data are confirmed to be multi-angle video images by checking the PSI data, then the video images of default camera positions are extracted. For example, the video image shot by one camera 21A is set as an image at the default position.

As for the method of extracting the video image to be displayed from the entire omnidirectional video images, driving software (device driver) of the MPEG decoder in the present receiver is remodeled so that any desired region can be displayed in accordance with the XY coordinates of the display region specified by the user.

When the user wants to change the viewpoint, the user specifies display start coordinates and display end coordinates in accordance with the motion of a cursor on a remote controller or that of a control panel of the receiver, thereby scrolling the display region in the omnidirectional video images.

In the case of multi-angle video images, there exists no seamless continuity between the images of mutually adjacent cameras, differently from the aforementioned 360° omnidirectional video images. For this reason, depression of a cursor key serves as an action to change the image, which is being displayed, to the image of the adjacent camera in the direction indicated by the cursor. For example, if a rightward cursor is depressed once when the video image of the default camera 21A is extracted and displayed out of the multi-angle video frames shown in FIG. 11, then the image being displayed is changed to the image of the camera 21B. Meanwhile, if a leftward cursor is depressed once in the same state, the image being displayed is changed to the image of the camera 21T.

In the case of zooming, the-user specifies display start coordinates and display end coordinates after calculation of the display region reduction ratio corresponding to the time of depression of a decision key in the remote controller or that of a decision key on the control panel of the receiver, and displays such coordinates.

C. System Configuration

Figure 14:
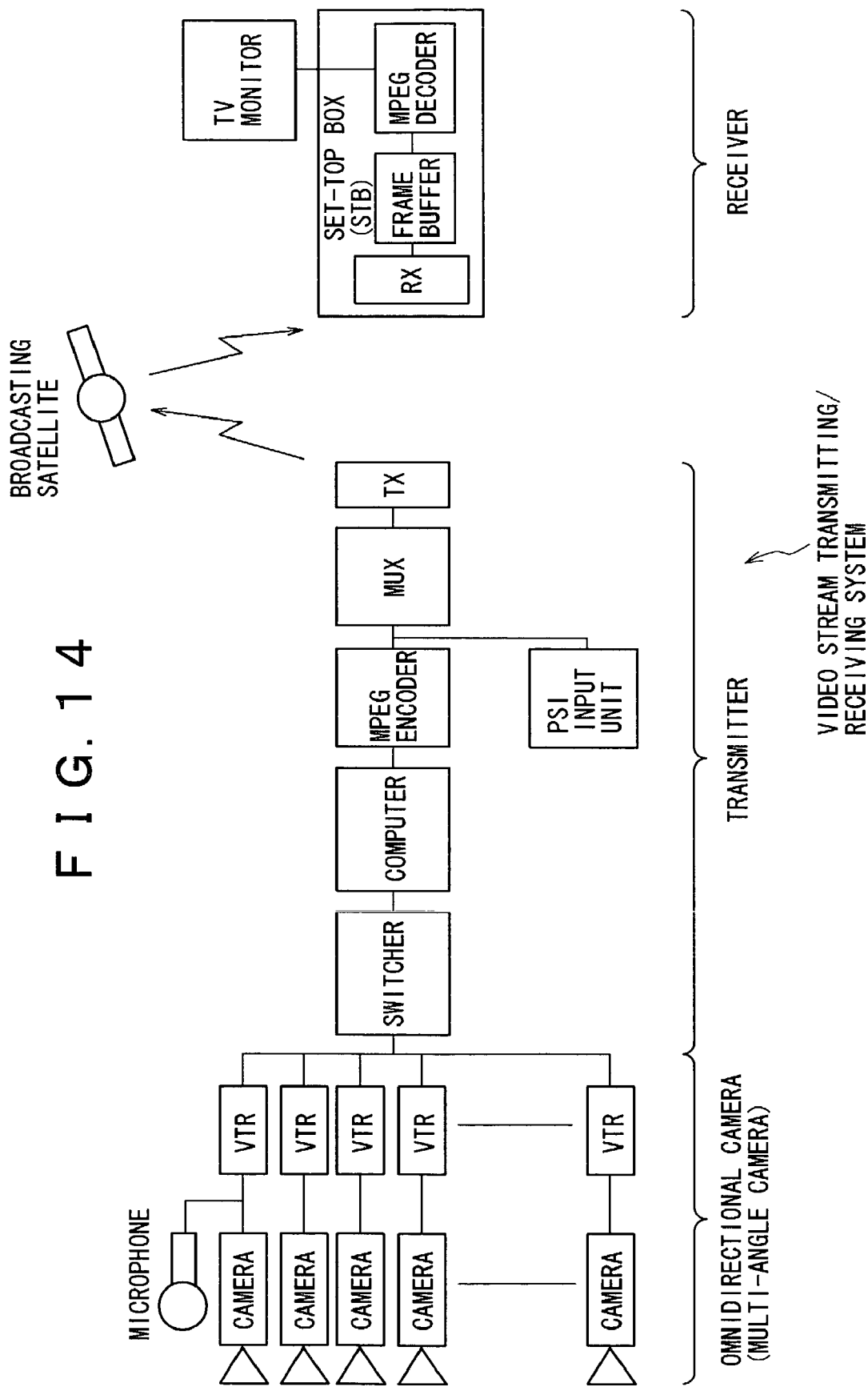
FIG. 14 is a diagram typically showing the entire hardware structure of a whole system to transmit and receive viewpoint-free video data.

In this clause, an explanation will be given on the configuration of a system to transmit and receive the omnidirectional video data or the multi-angle video data mentioned above. FIG. 14 typically shows the entire hardware structure of a whole system for transmitting and receiving viewpoint-free video data.

A camera system for shooting omnidirectional video images in a predetermined site or multi-angle video images relative to a specific subject includes a plurality of cameras, as already described in connection with FIGS. 1 and 8. The camera system may further include a microphone for inputting audio data obtained in the shooting site.

When the camera system shoots omnidirectional video images from one viewpoint in the space, the component cameras are positioned substantially at equal intervals in a predetermined circumferential direction. Meanwhile, when the camera system shoots multi-angle video images of a subject, the component cameras are positioned substantially at equal intervals in a circumferential direction around the subject in a manner to surround the specific subject.

A VTR is connected to each of the individual cameras, so that a plurality of video (and audio) streams can be recorded.

The video streams thus recorded are captured via a switcher to be thereby taken into a computer as computer data (bit-mapped files), whereby a variety of computer processing can be executed. For example, the video images from the individual cameras are captured and processed through data processing, generation of bit-mapped serial file data, rendering of video frames and so forth, hence generating omnidirectional video data or multi-angle video data for distribution.

Such omnidirectional video data or multi-angle video data outputted for distribution from the computer are video frames having a size of 1920×1080 pixels that can be handled in the HD-MPEG format. An MPEG encoder provided in the following stage encodes the video streams in conformity with the HD-MPEG format.

A PSI input unit sets a flag indicating that the video streams are viewpoint-free omnidirectional or multi-angle video images. A multiplexer (MUX) multiplexes the video streams and the PSI data encoded in conformity with the HD-MPEG format.

The video streams are transmitted as satellite waves from a transmitter (TX) and are delivered to a receiving set-top box (STB) via a broadcasting satellite.

On the receiver side, the video streams received by a receiver (RX) are once held in a frame buffer, and then are decoded by an MPEG decoder and are displayed on a TV monitor screen.

Meanwhile on the receiver side, first the PSI data are checked to confirm that the received video frames are either omnidirectional video images or multi-angle video images. Then the video image obtained from the default camera is extracted and displayed on the TV monitor.

As for the method of extracting the video image to be displayed from the entire omnidirectional or multi-angle video images, driving software (device driver) of the MPEG decoder in the present receiver is remodeled so that any desired region can be displayed in accordance with the XY coordinates of the display region specified by the user.

In case the user wants to change the viewpoint, the user specifies display start coordinates and display end coordinates in accordance with the motion of a cursor on a remote controller or that of a control panel of the receiver, thereby scrolling the display region in the omnidirectional video images.

Similarly, in the case of zooming, the user specifies display start coordinates and display end coordinates after calculation of the display region reduction ratio corresponding to the time of depression of a decision key in the remote controller or that of a decision key on the control panel of the receiver, and displays such coordinates.

A routine for reproducing the video streams on the receiver side will be described later in detail.

FIG. 14 shows an exemplary system configuration for distributing omnidirectional or multi-angle video streams by satellite broadcasting. However, it is to be understood that a similar configuration is also usable for transmission by terrestrial broadcasting or cable television broadcasting merely with the exception that the communication medium used between a transmitter and a receiver is different.

Figure 15:
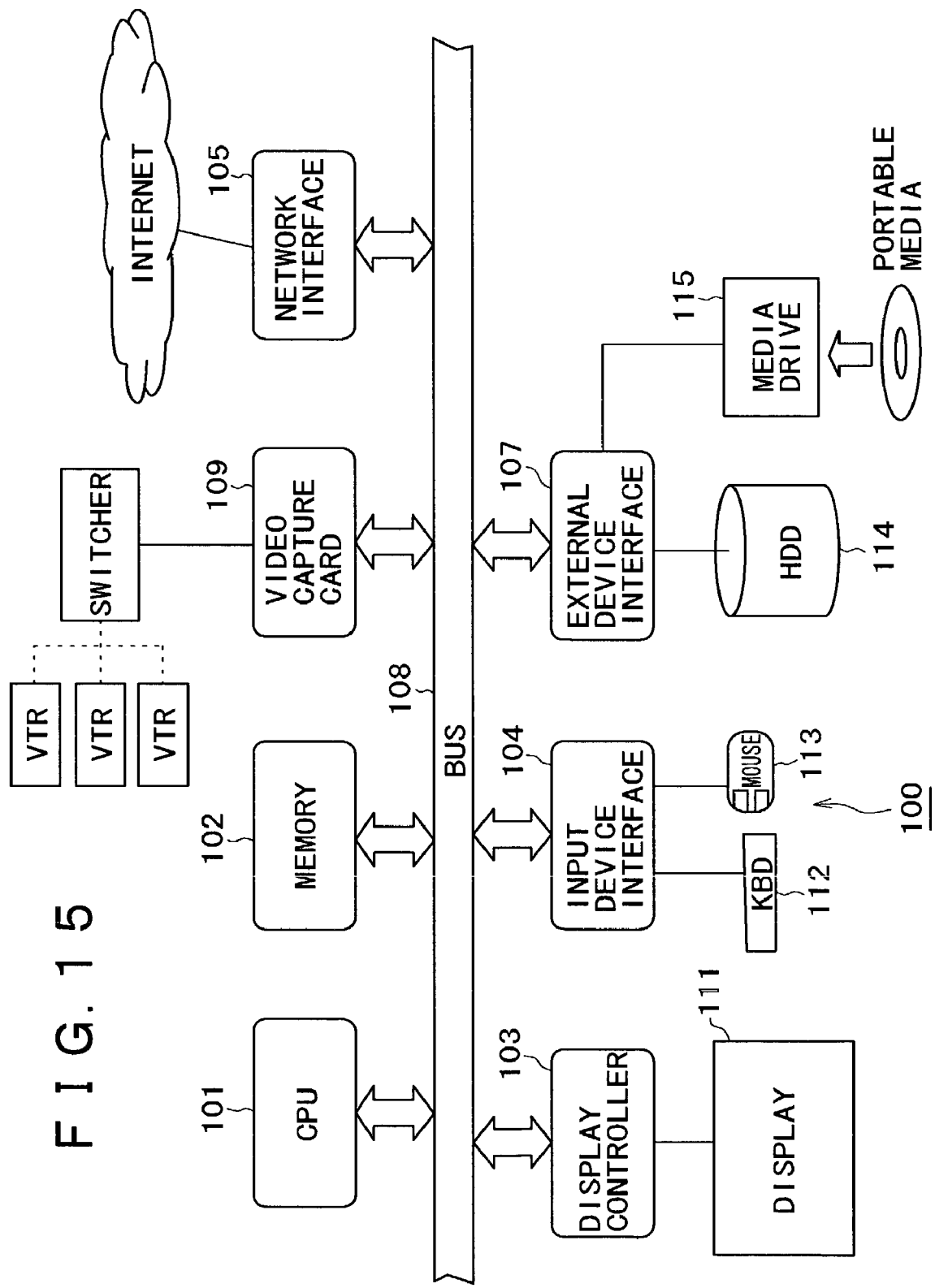
FIG. 15 is a diagram typically showing the hardware structure of a computer for capturing the video images of the individual cameras, and executing data processing, generation of bit-mapped serial file data, rendering of the video frames and so forth.

FIG. 15 typically shows the hardware structure of a computer 100 for capturing the video images of the individual cameras and executing data processing, generation of bit-mapped serial file data, rendering of video frames and so forth.

A CPU (Central Processing Unit) 101 serving as a main controller in the system 100 executes various applications under control of an operating system (OS). The CPU 101 is capable of executing, for example, omnidirectional and multi-angle video processing software with processing of the captured video image data from the cameras, generation of bit-mapped serial file data, rendering of video frames and so forth. As shown in this diagram, the CPU 101 is interconnected with other undermentioned apparatus via a bus 108.

A memory 102 is a storage device used for storing program codes executed in the CPU 101, or for temporarily saving the work data being executed. It is to be understood that the memory 102 shown in this diagram connotes both a nonvolatile memory such as ROM and a volatile memory such as DRAM.

A display controller 103 is an exclusive one for actually processing a drawing instruction issued from the CPU 101. The drawing data processed in the display controller 103 are once written in, e.g., a frame buffer (not shown) and then are outputted as picture from a display 111. The display controller 103 and the display 111 constitute a data output unit 22 which outputs the pasted data 20 based on three-dimensional data.

An input device interface 104 is used for connecting a user's input device such as a keyboard 112, a mouse 113 or the like to the computer system 100.

A network interface 105 is capable of connecting the system 100 to a local network such as LAN (Local Area Network) or a wide area network such as Internet in accordance with a predetermined communication protocol of Ethernet or the like.

On the network, a plurality of host terminals (not shown) are connected in a transparent state to thereby construct a dispersed computing environment. It is possible on the network to distribute software programs, data contents and so forth. For example, omnidirectional or multi-angle video processing software, which is used for processing the captured video data of the cameras through data processing, generation of bit-mapped serial file data, rendering of video frames and so forth, can be down-loaded via the network. It is further possible to distribute, via the network, the individual frame data shot by the omnidirectional or multi-angle cameras, or the rendered omnidirectional or multi-angle video streams.

An external device interface 107 is used for connecting an external device such as a hard disk drive (HDD) 114, a media drive 115 or the like to the system 100.

As known, the HDD 114 is an external storage device where a stationary magnetic disk is provided as a storage carrier, and it is superior to any other external storage device with respect to a storage capacity and a data transfer rate. To place a software program on the HDD 114 in an executable state is termed to "install" the program in the system. Normally a program code of the operating system, an application program, a device driver and so forth to be executed by the CPU 101 are stored in the HDD 114 in a nonvolatile manner.

For example, omnidirectional and multi-angle video image processing software can be installed on the HDD 114 for processing the captured video data from the cameras, and executing generation of bit-mapped serial file data, rendering of video frames and so forth. It is also possible to save, on the HDD 114, the contents such as the individual frame data shot by the omnidirectional cameras or multi-angle cameras, the rendered omnidirectional video streams and multi-angle video streams, and so forth.

A media drive 115 is a device loaded with portable media such as CD (compact disc), MO (magneto-optical disc), DVD (digital versatile disc) and so forth, and enabling access to the data recording plane thereof.

Portable media are used principally for backing up the software programs or the data files as computer-readable data, or for transferring the same between systems (including sales, circulation and distribution). For example, software to process omnidirectional or multi-angle video images by processing the captured video data obtained from the cameras, or by generating bit-mapped serial file data or rendering the video frames, can be physically circulated or distributed between a plurality of apparatus by the use of such portable media. Further, the contents inclusive of the individual frame data shot by the omnidirectional or multi-angle cameras, and the rendered omnidirectional or multi-angle video streams, can be physically circulated or distributed between a plurality of apparatus by the use of such portable media.

A video capture card 109 is a device for taking into the computer the video signals reproduced from each VTR connected via a switcher, as computer data (bit-mapped file). At the time when the video images obtained from each camera and recorded by the VTR have been captured as a bit-mapped file by the computer, the video image of one frame in one video stream is expressed as a still picture composed of 720×480 pixels.

The computer 100 shown as an example in FIG. 15 is an interchangeable or succeeding apparatus of the personal computer "PC/AT (personal computer/advanced technology)" manufactured by the IBM Corporation, U.S.A. It is a matter of course that a computer equipped with some other architecture may be applied as the computer 100 employed in this embodiment.

D. Reproduction of Video Stream on Receiver Side

On the receiver side, as described already, first the PSI data are checked to confirm that the received video frames are either omnidirectional video images or multi-angle video images. Then the video image obtained from the default camera is extracted and displayed on the TV monitor.

As for the method of extracting the video image to be displayed from the entire omnidirectional or multi-angle video images, driving software (device driver) of the MPEG decoder in the present receiver is remodeled so that any desired region can be displayed in accordance with the XY coordinates of the display region specified by the user.

In case the user wants to change the viewpoint on the receiver, for example, the user specifies display start coordinates and display end coordinates in accordance with the motion of the cursor on the remote controller or that of the control panel of the receiver, thereby scrolling the display region in the omnidirectional video images. Similarly, in the case of zooming, the user specifies display start coordinates and display end coordinates after calculation of the display region reduction ratio corresponding to the time of depression of the decision key in the remote controller or that of the decision key on the control panel of the receiver, and displays such coordinates.

In this clause, an explanation will be given on reproduction of video streams performed on the receiver side.

FIG. 16 is a flowchart of a processing routine realized by video stream reproduction software executed on the receiver side.

Upon reception of the broadcast data (step S71), flag data are extracted from the PSI data (step S72), and a decision is made as to whether the received data represent a viewpoint-free video stream or not (step S73).

If the result of the above decision signifies that the received data are not a viewpoint-free video stream, the received data are decoded as ordinary broadcast data in conformity with the MPEG format (step S74), and the decoded video stream is displayed ordinarily on the screen of the TV monitor (step S75).

Meanwhile, if the result of the above decision signifies that the received data represent a viewpoint-free video stream (step S73), another decision is made as to whether the received data are 360° omnidirectional video data or not (step S76).

In case the result of this decision signifies that the received data are 360° omnidirectional video data, default display start coordinates Start (640, 21) and display end coordinates End (1280, 453) are specified as a default video extraction position to be displayed on the TV monitor (step S77). The default coordinate position corresponds to the default camera position.

When the viewer or user has specified a change from the default coordinate position (i.e., change of the viewpoint) via the cursor key or the decision key on the receiver (step S78), the coordinates are calculated in accordance with the manipulation of the key, and the display start coordinates Start and the display end coordinates End to be displayed on the TV monitor are changed in compliance with the calculated coordinates (step S79).

Subsequently, the region specified by the display start coordinates Start and the display end coordinates End is extracted from the received omnidirectional video frame (step S80), then the extracted region is decoded in conformity with the MPEG format (step S81), and it is displayed as an enlarged picture on the full screen of the TV monitor (step S82).

After such enlarged display on the full screen of the TV monitor, a process of an undermentioned interruption (1) may be executed occasionally.

In case the result of the decision at step S76 signifies that the received data are not 360° omnidirectional video data, another decision is made as to whether the received data are multi-angle video data relative to a certain subject (step S83).

Meanwhile, if the received data are multi-angle video data, default display start coordinates Start (0, 0) and display end coordinates End (533, 360) are specified as a default video extraction position to be displayed on the TV monitor (step S84).

When the viewer or user has specified a change from the default coordinate position (i.e., change of the viewpoint) via the cursor key or the decision key on the receiver (step S85), the coordinates are calculated in accordance with the manipulation of the key, and the display start coordinates Start and the display end coordinates End to be displayed on the TV monitor are changed in compliance with the calculated coordinates (step S86).

Subsequently, the region specified by the display start coordinates Start and the display end coordinates End is extracted from the received multi-angle video frame (step S87), then the extracted region is decoded in conformity with the MPEG format (step S88), and it is displayed as an enlarged picture on the full screen of the TV monitor (step S89).

After such enlarged display on the full screen of the TV monitor, a process of an undermentioned interruption (2) may be executed occasionally.

In case the result of the decision at step S83 signifies that the received data are not multi-angle video data, another decision is made as to whether the received data are HDTV extractive broadcast data or not (step S90).

If the received data are HDTV extractive broadcast data, default display start coordinates Start (0, 0) and display end coordinates End (720, 480) are specified as a default video extraction position to be displayed on the TV monitor (step S91).

When the viewer or user has specified a change from the default coordinate position (i.e., change of the viewpoint) via the cursor key or the decision key on the receiver (step S92), the coordinates are calculated in accordance with the manipulation of the key, and the display start coordinates Start and the display end coordinates End to be displayed on the TV monitor are changed in compliance with the calculated coordinates (step S93).

Subsequently, the region specified by the display start coordinates Start and the display end coordinates End is extracted from the received HDTV extractive broadcast data (step S94), then the extracted region is decoded in conformity with the MPEG format (step S95), and it is displayed as an enlarged picture on the full screen of the TV monitor (step S96).

After such enlarged display on the full screen of the TV monitor, a processing of an undermentioned interruption (3) may be executed occasionally.

Meanwhile, in case the result of the decision at step S90 signifies that the received data are not HDTV extractive broadcast data, a predetermined exceptional process is executed (step S98).

And after the process of display on the TV monitor or such exceptional process, the broadcast data relative to the next frame are received (step S98).

In displaying the received video data on the TV monitor, the coordinate axis is defined as shown in FIG. 17. The received video data are composed of 1920×1080 pixels (as mentioned), and the display start coordinates Start indicate the upper left position of the region to be extracted, and the display end coordinates End indicate the lower right position of the region to be extracted.

In the processing routine of FIG. 16, the 360° omnidirectional video data, multi-angle video data or HDTV extractive broadcast data are displayed on the full screen of the TV monitor, and then there may occur a case of generation of an interruption (1), an interruption (2) or an interruption (3) Hereinafter each of such interruptions will be described in detail.

Interruption (1):

This interruption is executed in response to depression of the cursor and decision keys during reception of the 360° omnidirectional video data. As already explained with reference to FIG. 6, the omnidirectional video frame is formed in compliance with a request to conform with the pixel size of the HD-MPEG format, wherein the video frame is divided into two along the transverse axis, and the right half is placed under the left half. In this process, therefore, it is necessary to scroll the extracted region seamlessly after turning back the same at the time point near each of the left and right edges. The fundamental process of interruption (1) will now be explained below.

Depression of Cursor Key

If the left or right cursor key is depressed for 1 msec, the coordinates are scrolled leftward or rightward by Äx pixels. Similarly, if the up or down cursor key is depressed for 1 msec, the coordinates are scrolled upward or downward by Äy pixels. In this case, the calculated values of coordinates are as follows.

(i) Depression of Right Cursor Key for n msec

[Expression 1]

$$\text{Start coordinates} = (\text{Start x coordinate before depression of cursor key} + n\text{Äx}, \text{Start y coordinate before depression of cursor key}) \quad (1)$$

$$\text{End coordinates} = (\text{Start x coordinate} + 640, \text{Start y coordinate} + 432) \quad (2)$$

However, the following equations are adopted in case the value obtained by adding 640 to the Start X coordinate calculated from Eq. (1) is over 1920 and under 3840.

[Expression 2]

Start coordinates=(Start x coordinate before depression of cursor key+nÄx−1920, Start y coordinate before depression of cursor key+453)

End coordinates=(Start x coordinate+640, Start y coordinate+432)

Further, the following equations are adopted in case the value obtained by adding 640 to the Start X coordinate calculated from Eq. (1) is over 3840 and under 4760.

[Expression 3]

Start coordinates=(Start x coordinate before depression of cursor key+nÄx−3840, Start y coordinate before depression of cursor key−453)

End coordinates=(Start x coordinate+640, Start y coordinate+432)

(ii) Depression of Left Cursor Key for n msec

[Expression 4]

Start coordinates=(Start x coordinate before depression of cursor key−nÄx, Start y coordinate before depression of cursor key)     (3)

End coordinates=(Start x coordinate+640, Start y coordinate+432)     (4)

However, the following equations are adopted in case the value obtained by adding 640 to the Start X coordinate calculated from Eq. (3) is over 1920 and under 3840.

[Expression 5]

Start coordinates=(Start x coordinate before depression of cursor key−nÄx−1920, Start y coordinate before depression of cursor key+453)

End coordinates=(Start x coordinate+640, Start y coordinate+432)

The following equations are adopted in case the value obtained by adding 640 to the Start X coordinate calculated from Eq. (1) is over 3840 and under 4760.

[Expression 6]

Start coordinates=(Start x coordinate before depression of cursor key−nÄx−3840, Start y coordinate before depression of cursor key−453)

End coordinates=(Start x coordinate+640, Start y coordinate+432)

(iii) Depression of Up Cursor Key for n msec

[Expression 7]

Start coordinates=(Start x coordinate before depression of cursor key, Start y coordinate before depression of cursor key−nÄy)     (5)

End coordinates=(Start x coordinate+640, Start y coordinate+432)     (6)

However, the following equations are adopted in case the Start Y coordinate before depression of the cursor key is over 0 and under 474, and the Start Y coordinate calculated from Eq. (5) is under 0.

[Expression 8]

Start coordinates=(Start x coordinate before depression of cursor key, 0)

End coordinates=(Start x coordinate+640, Start y coordinate+432)

Further, the following equations are adopted in case the Start Y coordinate before depression of the cursor key is over 474 and under 948, and the Start Y coordinate calculated from Eq. (5) is under 474.

[Expression 9]

Start coordinates=(Start x coordinate before depression of cursor key, 474)

End coordinates=(Start x coordinate+640, Start y coordinate+432)

(iv) Depression of Down Cursor Key for n msec

[Expression 10]

Start coordinates=(Start x coordinate before depression of cursor key, Start y coordinate before depression of cursor key+nÄy)     (7)

End coordinates=(Start x coordinate+640, Start y coordinate+432)     (8)

However, the following equations are adopted in case the Start Y coordinate before depression of the cursor key is over 0 and under 474, and the Start Y coordinate calculated from Eq. (7) is over 42.

[Expression 11]

Start coordinates=(Start x coordinate before depression of cursor key, 42)

End coordinates=(Start x coordinate+640, Start y coordinate+432)

Further, the following equations are adopted in case the Start Y coordinate before depression of the cursor key is over 474 and under 948, and the Start Y coordinate calculated from Eq. (7) is over 516.

[Expression 12]

Start coordinates=(Start x coordinate before depression of cursor key, 474)

End coordinates=(Start x coordinate+640, Start y coordinate+432)

Depression of Decision Key and Return Key (v) Depression of Decision Key

If the decision key is depressed, the region to be extracted is reduced in proportion to the time of depression with the aspect ratio kept unchanged. Therefore, when any of the aforementioned events (i) to (iv) is generated after depression of the decision key, the region is scrolled while the area thereof is kept unchanged.

With regard to restrictions on the scroll range, the scroll range is determined on the basis of (i) to (iv), but since the area of the region is different depending on each case, the coordinates become different from the numerical values explained in connection with the above (i) to (iv).

(v) Depression of Return Key

If the return key is depressed after depression of the decision key, the region to be extracted is enlarged in proportion to the time of depression with the aspect ratio kept unchanged. (However, the region is not enlarged beyond the area in a default state.) When the area is in the default state, no change is caused despite depression of the return key.

Interruption (2):

This interruption is executed in response to depression of the cursor and decision keys during reception of the multi-angle video data. As already described, there exists no seamless continuity between the video images of mutually adjacent cameras differently from the 360° omnidirectional video images, so that it is not necessary to perform seamless scroll of the entire picture. The fundamental process of interruption (2) will now be explained below.

Scroll of cursor in default state (during extraction of video image shot by camera 21A)

Depression of Cursor Key (*)

(i) When the right cursor key is depressed, extraction is switched to the video image of camera 21B.

(ii) When the left cursor key is depressed, extraction is switched to the video image of camera 21T.

* Depression of the up or down cursor key causes no change.

Depression of Decision Key and Return Key (iii) Depression of Decision Key

If the decision key is depressed, the region to be extracted is reduced in proportion to the time of depression with the aspect ratio kept unchanged. Therefore, when either of the aforementioned events (i) to (ii) is effected after depression of the decision key, the region is scrolled while the area thereof is kept unchanged. The scroll range is restricted to be within the picture of the same camera.

After depression of the decision key, an upward or downward scroll is rendered possible by depressing the up or down cursor key. In this case also, the scroll range is restricted to be within the picture of the same camera.

(iv) Depression of Return Key

If the return key is depressed after depression of the decision key, the region to be extracted is enlarged in proportion to the time of depression with the aspect ratio kept unchanged. (However, the region is not enlarged beyond the area in a default state.) When the area is in the default state, no change is caused despite depression of the return key. The process executed after depression of the return key and the cursor key in this order is the same as that denoted by (*)

Interruption (3):

This interruption is executed in response to depression of the cursor and decision keys during reception of the HDTV extractive broadcast data. In this case, it is not necessary to perform seamless scroll of the entire picture while turning back from the edge of the picture, and the scroll event by the cursor key is executed in a range of 1920×1080 pixels. When the extracted region has been moved to the terminal end as a result of the scroll, a predetermined process is executed so as not to permit any further scroll in the same direction.

Although the present invention has been described in detail hereinabove with reference to some specific embodiments thereof, it is apparent that a variety of other changes, modifications and substitutes of the embodiments are achievable by those skilled in the art without departing from the spirit of the invention.

In this specification, the invention has been explained in relation to an exemplary broadcasting system which transmits and receives viewpoint-free omnidirectional video images and multi-angle video images. However, the spirit of the present invention is not limited to such example alone. In addition to the embodiments mentioned, similar viewpoint-free reception can be realized by utilizing the contrivance to extract ordinary HDTV video images from a desired viewpoint on the receiver side. In this case, none of special data processing is required on the transmitter side, and viewpoint-free broadcasting is indicated by the use of PSI data or the like. And after detection of its flag on the receiver side, it becomes possible to receive the broadcast by the same receiver software and to perform extraction and display.

In short, the present invention has been disclosed merely for illustrative purposes, and the contents of this specification are not to be interpreted restrictively. Therefore, for judging the spirit of the present invention, the appended claims determining the scope of the invention are to be taken into consideration.

According to the present invention, as described above in detail, superior improvements are achievable in a video data processing apparatus, a video data processing method, a data distributing apparatus, a data distributing method, a data receiving apparatus, a data receiving method and a storage medium capable of adequately distributing video images shot by an omnidirectional camera which consists of a plurality of cameras having individual visual fields and so positioned as to shoot ambient omnidirectional pictures from one viewpoint in the space.

Also according to the present invention, superior improvements are achievable in a video data processing apparatus, a video data processing method, a data distributing apparatus, a data distributing method, a data receiving apparatus, a data receiving method and a storage medium capable of distributing video images, which are obtained from a plurality of cameras, in such a manner that the video images at any desired place can be selected on the receiver side.

Further according to the present invention, superior improvements are achievable in a video data processing apparatus, a video data processing method, a data distributing apparatus, a data distributing method, a data receiving apparatus, a data receiving method and a storage medium capable of distributing video images, which are obtained from a plurality of cameras, in such a manner that the video images can be switched seamlessly on the receiver side.

Thus, the present invention realizes reception of omnidirectional video images where the viewpoint is freely changeable by a user. And a variety of uses are attainable as disclosed in this specification, inclusive of 360° broadcasting, multi-angle broadcasting, HDTV extractive broadcasting and so forth.

The feature of the present invention resides in that the viewpoint is freely selectable instead of utilizing the HDTV-size video data to enhance the picture quality. Further, although multi-angle broadcasting can be partly realized by the existing technology through the use of plural channels, the present invention accomplishes such broadcasting by one channel alone to consequently curtail the transmission cost, and can sufficiently fulfill the requirements by merely one broadcasting station.

In addition to the above embodiments, the plural cameras used for shooting need not be positioned around a subject, and it is possible to provide a program receivable and viewable by the user with a sense of switching the shooting camera.

The broadcasting system relative to the present invention is applicable to cable television as well as to digital broadcasting. And the same format is applicable also to broadcasting via any broadband network.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A video data processing apparatus for processing video data obtained from a plurality of cameras which are positioned in such a manner that the visual directions thereof are set at a predetermined angular interval on one horizontal plane so as to shoot ambient pictures from one viewpoint in the space, said apparatus comprising:
   means for generating video images of a first rectangular plane by sequentially pasting the video data from the individual cameras in accordance with the camera positioning order;
   means for generating a second rectangular plane by equally dividing said first rectangular plane into segments and then arranging the segments sequentially from top;
   means for generating a third rectangular plane by duplicating a region of a predetermined area from the left or right edge of each segment at the edge of the other segment to be connected to the relevant one edge;
   means for generating a fourth rectangular plane by reducing said third rectangular plane to a size adapted to be contained in a predetermined encoding format; and
   means for generating a fifth rectangular plane by attaching dummy data to an unused region so that said fourth rectangular plane conforms with said predetermined picture compression format.

2. The video data processing apparatus according to claim 1, wherein said encoding format is based on the HD (High Definition)-MPEG 2 (Moving Picture Experts Group 2) standards.

3. The video data processing apparatus according to claim 1, further comprising means for rendering bit-mapped serial file data where the fifth rectangular planes are arrayed in time series.

4. The video data processing apparatus according to claim 1, further comprising means for generating transport stream data by converting the data into predetermined output signals and compressing the same in conformity with said encoding format.

5. A video data processing method for processing video data obtained from a plurality of cameras which are positioned in such a manner that the visual directions thereof are set at a predetermined angular interval on one horizontal plane so as to shoot ambient pictures from one viewpoint in the space, said method comprising:
   a step of generating video images of a first rectangular plane by sequentially pasting the video data from the individual cameras in accordance with the camera positioning order;
   a step of generating a second rectangular plane by equally dividing said first rectangular plane into segments and then arranging the segments sequentially from top;
   a step of generating a third rectangular plane by duplicating a region of a predetermined area from the left or right edge of each segment at the edge of the other segment to be connected to the relevant one edge;
   a step of generating a fourth rectangular plane by reducing said third rectangular plane to a size adapted to be contained in a predetermined encoding format; and
   a step of generating a fifth rectangular plane by attaching dummy data to an unused region so that said fourth rectangular plane conforms with said predetermined picture compression format.

6. The video data processing method according to claim 5, wherein said encoding format is based on the HD (High Definition)-MPEG 2 (Moving Picture Experts Group 2) standards.

7. The video data processing method according to claim 5, further comprising a step of rendering bit-mapped serial file data where the fifth rectangular planes are arrayed in time series.

8. The video data processing method according to claim 5, further comprising a step of generating transport stream data by converting the data into predetermined output signals and compressing the same in conformity with said encoding format.

9. A data distributing apparatus for distributing video data, which are obtained from a plurality of cameras so positioned that the visual directions thereof are set at a predetermined angular interval on one horizontal plane for shooting ambient pictures from one viewpoint in the space, in such a manner that the viewpoint is changeable freely on the receiving side, said apparatus comprising:
   means for generating video images of a first rectangular plane by sequentially pasting the video data from the individual cameras in accordance with the camera positioning order;
   means for generating a second rectangular plane by equally dividing said first rectangular plane into segments and then arranging the segments sequentially from top;
   means for generating a third rectangular plane by duplicating a region of a predetermined area from the left or right edge of each segment at the edge of the other segment to be connected to the relevant one edge;
   means for generating a fourth rectangular plane by reducing said third rectangular plane to a size adapted to be contained in a predetermined encoding format;
   means for generating a fifth rectangular plane by attaching dummy data to an unused region so that said fourth rectangular plane conforms with said predetermined picture compression format;
   means for rendering bit-mapped serial file data where the fifth rectangular planes are arrayed in time series;
   means for generating transport stream data by converting the rendered bit-mapped serial file data into predetermined output signals and compressing the same in conformity with said encoding format; and
   means for transmitting the transport stream data.

10. The data distributing apparatus according to claim 9, wherein said encoding format is based on the HD (High Definition)-MPEG 2 (Moving Picture Experts Group 2) standards.

11. The data distributing apparatus according to claim 9, further comprising means for attaching information to signify that the transport stream data are of viewpoint free type.

12. A data distributing method for distributing video data, which are obtained from a plurality of cameras so positioned that the visual directions thereof are set at a predetermined angular interval on one horizontal plane for shooting ambient pictures from one viewpoint in the space, in such a manner that the viewpoint is changeable freely on the receiving side, said method comprising:
   a step of generating video images of a first rectangular plane by sequentially pasting the video data from the individual cameras in accordance with the camera positioning order;
   a step of generating a second rectangular plane by equally dividing said first rectangular plane into segments and then arranging the segments sequentially from top;

a step of generating a third rectangular plane by duplicating a region of a predetermined area from the left or right edge of each segment at the edge of the other segment to be connected to the relevant one edge;

a step of generating a fourth rectangular plane by reducing said third rectangular plane to a size adapted to be contained in a predetermined encoding format;

a step of generating a fifth rectangular plane by attaching dummy data to an unused region so that said fourth rectangular plane conforms with said predetermined picture compression format;

a step of rendering bit-mapped serial file data where the fifth rectangular planes are arrayed in time series;

a step of generating transport stream data by converting the rendered bit-mapped serial file data into predetermined output signals and compressing the same in conformity with said encoding format; and a step of transmitting the transport stream data.

13. The data distributing method according to claim 12, wherein said encoding format is based on the HD (High Definition)-MPEG 2 (Moving Picture Experts Group 2) standards.

14. The data distributing method according to claim 12, further comprising a step of attaching information to signify that the transport stream data are of viewpoint free type.

15. A video data processing apparatus for processing multi-angle video data obtained from a plurality of cameras which are positioned to surround a subject in the space and shoot the subject from a plurality of visual angles, said apparatus comprising:

means for generating video images of a first rectangular plane by sequentially pasting the video data from the individual cameras in accordance with the camera positioning order;

means for generating a second rectangular plane by reducing said first rectangular plane to a size adapted to be contained in a predetermined encoding format; and means for generating a third rectangular plane by attaching dummy data to an unused region so that said second rectangular plane conforms with said predetermined picture compression format.

16. The video data processing apparatus according to claim 15, wherein said encoding format is based on the HD (High Definition)-MPEG 2 (Moving Picture Experts Group 2) standards.

17. The video data processing apparatus according to claim 15, further comprising means for rendering bit-mapped serial file data where the third rectangular planes are arrayed in time series.

18. The video data processing apparatus according to claim 15, further comprising means for generating transport stream data by converting the data into predetermined output signals and compressing the same in conformity with said encoding format.

19. A video data processing method for processing multi-angle video data obtained from a plurality of cameras which are positioned to surround a subject in the space and shoot the subject from a plurality of visual angles, said method comprising:

a step of generating video images of a first rectangular plane by sequentially pasting the video data from the individual cameras in accordance with the camera positioning order;

a step of generating a second rectangular plane by reducing said first rectangular plane to a size adapted to be contained in a predetermined encoding format; and a step of generating a third rectangular plane by attaching dummy data to an unused region so that said second rectangular plane conforms with said predetermined picture compression format.

20. The video data processing method according to claim 19, wherein said encoding format is based on the HD (High Definition)-MPEG 2 (Moving Picture Experts Group 2) standards.

21. The video data processing method according to claim 19, further comprising a step of rendering bit-mapped serial file data where the third rectangular planes are arrayed in time series.

22. The video data processing method according to claim 19, further comprising a step of generating transport stream data by converting the data into predetermined output signals and compressing the same in conformity with said encoding format.

23. A data distributing apparatus for distributing multi-angle video data, which are obtained from a plurality of ambient cameras around a subject in the space by shooting the subject from a plurality of visual field angles, in such a manner that the viewpoint is changeable freely on the receiver side, said apparatus comprising:

means for generating video images of a first rectangular plane by sequentially pasting the video data from the individual cameras in accordance with the camera positioning order;

means for generating a second rectangular plane by reducing said first rectangular plane to a size adapted to be contained in a predetermined encoding format;

means for generating a third rectangular plane by attaching dummy data to an unused region so that said second rectangular plane conforms with said predetermined picture compression format;

means for rendering bit-mapped serial file data where the third rectangular planes are arrayed in time series;

means for generating transport stream data by converting the rendered bit-mapped serial file data into predetermined output signals and compressing the same in conformity with said encoding format; and means for transmitting the transport stream data.

24. The data distributing apparatus according to claim 23, wherein said encoding format is based on the HD (High Definition)-MPEG 2 (Moving Picture Experts Group 2) standards.

25. The data distributing apparatus according to claim 23, further comprising means for attaching information to signify that the transport stream data are of viewpoint free type.

26. A data distributing method for distributing multi-angle video data, which are obtained from a plurality of ambient cameras around a subject in the space by shooting the subject from a plurality of visual field angles, in such a manner that the viewpoint is changeable freely on the receiver side, said method comprising:

a step of generating video images of a first rectangular plane by sequentially pasting the video data from the individual cameras in accordance with the camera positioning order;

a step of generating a second rectangular plane by reducing said first rectangular plane to a size adapted to be contained in a predetermined encoding format;

a step of generating a third rectangular plane by attaching dummy data to an unused region so that said second rectangular plane conforms with said predetermined picture compression format;

a step of rendering bit-mapped serial file data where the third rectangular planes are arrayed in time series;

a step of generating transport stream data by converting the rendered bit-mapped serial file data into predetermined output signals and compressing the same in conformity with said encoding format; and a step of transmitting the transport stream data.

27. The data distributing method according to claim 26, wherein said encoding format is based on the HD (High Definition)-MPEG 2 (Moving Picture Experts Group 2) standards.

28. The data distributing method according to claim 26, further comprising a step of attaching information to signify that the transport stream data are of viewpoint free type.

29. A storage medium where computer software is physically stored in a manner to be readable by a computer, said software being so described as to execute, on a computer system, a routine of processing the video data obtained from a plurality of cameras whose visual directions are set at a predetermined angular interval on one horizontal plane for shooting ambient pictures from one viewpoint in the space, said computer software comprising:

a step of generating video images of a first rectangular plane by sequentially pasting the video data from the individual cameras in accordance with the camera positioning order;

a step of generating a second rectangular plane by equally dividing said first rectangular plane into segments and then arranging the segments sequentially from top;

a step of generating a third rectangular plane by duplicating a region of a predetermined area from the left or right edge of each segment at the edge of the other segment to be connected to the relevant one edge;

a step of generating a fourth rectangular plane by reducing said third rectangular plane to a size adapted to be contained in a predetermined encoding format; and a step of generating a fifth rectangular plane by attaching dummy data to an unused region so that said fourth rectangular plane conforms with said predetermined picture compression format.

30. A storage medium where computer software is physically stored in a manner to be readable by a computer, said software being so described as to execute, on a computer system, a routine of processing the multi-angle video data obtained from a plurality of ambient cameras around a subject in the space by shooting the subject from a plurality of visual angles, said computer software comprising:

a step of generating video images of a first rectangular plane by sequentially pasting the video data from the individual cameras in accordance with the camera positioning order;

a step of generating a second rectangular plane by reducing said first rectangular plane to a size adapted to be contained in a predetermined encoding format; and a step of generating a third rectangular plane by attaching dummy data to an unused region so that said second rectangular plane conforms with said predetermined picture compression format.

31. A computer program so described as to execute, on a computer system, a routine of processing the video data obtained from a plurality of cameras whose visual directions are set at a predetermined angular interval on one horizontal plane for shooting ambient pictures from one viewpoint in the space, said computer program comprising:

a step of generating video images of a first rectangular plane by sequentially pasting the video data from the individual cameras in accordance with the camera positioning order;

a step of generating a second rectangular plane by equally dividing said first rectangular plane into segments and then arranging the segments sequentially from top;

a step of generating a third rectangular plane by duplicating a region of a predetermined area from the left or right edge of each segment at the edge of the other segment to be connected to the relevant one edge;

a step of generating a fourth rectangular plane by reducing said third rectangular plane to a size adapted to be contained in a predetermined encoding format; and a step of generating a fifth rectangular plane by attaching dummy data to an unused region so that said fourth rectangular plane conforms with said predetermined picture compression format.

32. A computer program so described as to execute, on a computer system, a routine of processing the multi-angle video data obtained from a plurality of ambient cameras around a subject in the space by shooting the subject from a plurality of visual angles, said computer program comprising:

a step of generating video images of a first rectangular plane by sequentially pasting the video data from the individual cameras in accordance with the camera positioning order;

a step of generating a second rectangular plane by reducing said first rectangular plane to a size adapted to be contained in a predetermined encoding format; and a step of generating a third rectangular plane by attaching dummy data to an unused region so that said second rectangular plane conforms with said predetermined picture compression format.

* * * * *